United States Patent [19]

Kakiuchi et al.

[11] Patent Number: 6,085,024

[45] Date of Patent: *Jul. 4, 2000

[54] ELECTRONIC STILL CAMERA AND MAGNETIC DISK

[75] Inventors: Shinichi Kakiuchi, Tokyo, Japan; Nobuya Sakai, Three Hills Alberta, Canada; Yuichi Kurosawa, Tokyo, Japan

[73] Assignee: Asahi Kogaku Kogyo Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/674,986

[22] Filed: Jul. 3, 1996

Related U.S. Application Data

[63] Continuation of application No. 08/066,632, May 25, 1993, abandoned, which is a continuation of application No. 07/698,116, May 10, 1991, abandoned, which is a continuation-in-part of application No. 07/687,018, Apr. 18, 1991, abandoned.

[30] Foreign Application Priority Data

| Apr. 25, 1990 | [JP] | Japan | 2-107371 |
| Apr. 25, 1990 | [JP] | Japan | 2-107372 |
| Apr. 25, 1990 | [JP] | Japan | 2-107373 |
| Apr. 25, 1990 | [JP] | Japan | 2-107374 |
| May 15, 1990 | [JP] | Japan | 2-124917 |

[51] Int. Cl.$^7$ ................................ H04N 5/225
[52] U.S. Cl. ............................ 386/107; 386/117
[58] Field of Search .................... 386/107, 120, 386/117, 121, 125, 40, 126, 96, 106, 38, 39, 124; 348/222, 207, 220; H04N 5/225

[56] References Cited

U.S. PATENT DOCUMENTS

| 4,574,319 | 3/1986 | Konishi ................................ 358/906 |
| 4,598,986 | 7/1986 | Shiratori et al. ........................ 354/410 |
| 4,631,590 | 12/1986 | Yamada et al. ......................... 360/33.1 |
| 4,800,448 | 1/1989 | Kaneko et al. ......................... 360/35.1 |
| 4,853,733 | 8/1989 | Wantanabe et al. ..................... 354/412 |

(List continued on next page.)

FOREIGN PATENT DOCUMENTS

| 0105213 | 4/1984 | European Pat. Off. . |
| 186883 | 7/1986 | European Pat. Off. . |
| 0336317 | 11/1989 | European Pat. Off. . |

(List continued on next page.)

OTHER PUBLICATIONS

Mano, M. Morris; "Compter System Architecture" 3$^{rd}$ edition; ®1993 by Prentice–Hall, Inc.; pp. 454–455.
"Informationstechnische Grundbildung MS–DOS"; by Ekkehard Kaier; Jan. 1989; pp. 24–25.
Japanese Patent Abstract (vol. 14, No. 165 (P–1030), Mar. 30, 1991.
Japanese Patent Abstract (vol. 14, No. 92 (P–1009), Feb. 20, 1990.
Japanese Patent Abstract (vol. 4, No. 107 (P–021), Jul. 31, 1980.
French Search Report.
English Abstract of Japanese Patent No. 1–288186.
English Abstract of Japanese Patent No. 62–067980.
English Abstract of Japanese Patent No. 2–118550.
English Abstract of Japanese Patent No. 58–126521.

*Primary Examiner*—Robert Chevalier
*Attorney, Agent, or Firm*—Greenblum & Bernstein, P.L.C.

[57] ABSTRACT

A magnetic disk for storing control data for controlling an electronic still camera. The magnetic disk is the same as used for recording an image and a sound. The control data is stored in a recording track in the form of DPSK-modulated data. A plurality of control data can be stored in a plurality of recording tracks, i.e., many different kinds of control data can be stored in the magnetic disk. The electronic still camera is controlled in accordance with the control data obtained from the magnetic disk.

25 Claims, 16 Drawing Sheets

U.S. PATENT DOCUMENTS

| | | | |
|---|---|---|---|
| 4,855,779 | 8/1989 | Ishikawa et al. | 354/412 |
| 4,858,012 | 8/1989 | Hino et al. | 360/14.1 |
| 4,912,570 | 3/1990 | Kinoshita et al. | 360/8 |
| 4,982,291 | 1/1991 | Kurahashi et al. | 358/906 |
| 5,032,927 | 7/1991 | Watanabe et al. | 358/909 |
| 5,047,869 | 9/1991 | Aoki et al. | 358/341 |
| 5,081,535 | 1/1992 | Kondo et al. | 358/228 |
| 5,086,345 | 2/1992 | Nakane et al. | 358/906 |
| 5,130,812 | 7/1992 | Yamaoka | 360/35.1 |
| 5,130,813 | 7/1992 | Oie et al. | 360/33.1 |
| 5,287,197 | 2/1994 | Sato . | |
| 5,339,199 | 8/1994 | Ogawa . | |
| 5,748,833 | 5/1998 | Sato . | |

FOREIGN PATENT DOCUMENTS

| | | |
|---|---|---|
| 2637436 | 4/1990 | France . |
| 2904818 | 8/1979 | Germany . |
| 4113547 | 10/1991 | Germany . |
| 55-64613 | 5/1980 | Japan . |
| 58-126521 | 7/1983 | Japan . |
| 59-64984 | 4/1984 | Japan . |
| 62-67980 | 3/1987 | Japan . |
| 62-67981 | 3/1987 | Japan . |
| 63-128323 | 5/1988 | Japan . |
| 1288186 | 11/1989 | Japan . |
| 1300237 | 12/1989 | Japan . |
| 2-21478 | 1/1990 | Japan . |
| 2-100478 | 4/1990 | Japan . |
| 2118550 | 5/1990 | Japan . |
| 2116397 | 2/1982 | United Kingdom . |
| 2225147 | 3/1986 | United Kingdom . |
| 2245406 | 1/1992 | United Kingdom . |

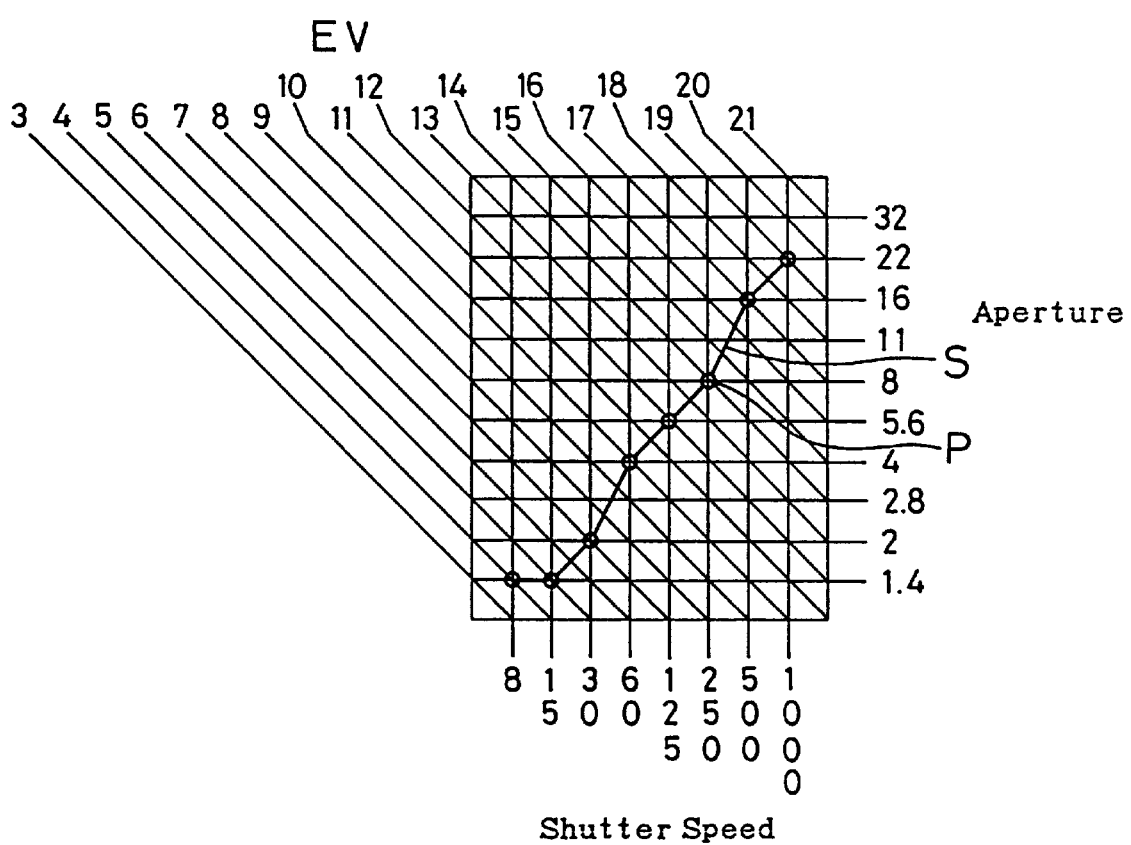

| EV | f-number | Shutter Value | EV | f-number | Shutter Value |

ELECTRONIC STILL CAMERA AND MAGNETIC DISK

This application is a continuation of application Ser. No. 08/066,632, filed May 25, 1993, now abandoned, Which is a continuation of application Ser. No. 07/698,116, filed May 10, 1991, now abandoned, which is a continuation-in-part of application Ser. No. 07/687,018, filed Apr. 18, 1991, now abandoned.

BACKGROUND OF THE INVENTION

This is a continuation-in-part application of U.S. application Ser. No. 07/687,018, which was filed on Apr. 18, 1991 by Y. KUROSAWA, N. SAKAI and S. KAKIUCHI, and which is entitled "Electronic Still Camera and Magnetic Disk", the contents of which are expressly incorporated herein by reference, in its entirety, into the present application.

1. Field of the Invention

The present invention relates to an electronic still camera in which a magnetic disk is mounted to store a video signal.

2. Description of the Related Art

Electronic still cameras have become very popular because an image photographed by an electronic still camera can be observed immediately after the photographing. Another reason for the popularity of the electronic still camera is that a magnetic disk used as a recording medium therein is easy to handle. For example, when a image photographed by the electronic still camera is recorded on a magnetic disk housed in the camera, even though portions of the magnetic disk remain unused, it can be freely removed from the camera and set in a reproducing device to observe the just-photographed image.

The magnetic disk is usually provided with 52 tracks, and images or sounds are recorded on the 1st through 50th track. The 52nd track is a cue track which can be used for recording a code by which an image and a sound are properly combined, and no information is recorded on the 51st track.

Such a conventional electronic still camera, however, can only carry out operations such as a zooming and an exposure control which are fixed, and therefore, a photographer cannot change these operations to achieve an aimed photographing operation.

SUMMARY OF THE INVENTION

Therefore, an object of the present invention is to provide an electronic still camera which can freely carry out various operations by a simple mechanism.

According to the present invention, there is provided a magnetic disk that is mounted in an electronic still camera. The magnetic disk comprises at least one recording track on which a video signal and/or an audio signal can be stored, and a storing mechanism which stores control data for controlling the electronic still camera. The storing mechanism is provided in at least a part of the same recording track. The control data is stored in the form of a DPSK modulated (differential-phase-shift-keying-modulated) data.

Further, according to the present invention, there it provided an electronic still camera in which a magnetic disk is mounted. The electronic still camera comprises a reading mechanism and a control mechanism. The reading mechanism reads control data stored on the magnetic disk in the form of DPSK modulated data. The control mechanism controls an operation of the electronic still camera in accordance with the control data.

According to a feature of the present invention, a magnetic disk is provided that is insertable in an electronic still camera. The magnetic disk comprises tracks for storing data, and a storing mechanism for storing control data by which a photographing operation of the electronic still camera is controlled. The storing mechanism is formable in at least one of the tracks.

According to an advantage of the present invention, a magnetic disk is provided having means for connecting the magnetic disk to the electronic still camera. At least one track of the magnetic disk is used for storing control data by which a photographing operation of the electronic still camera is operated.

According to another advantage of the present invention, a magnetic disk is provided for storing control data by which a photographing operation of the electronic still camera is controlled.

According to another feature of the present invention, there is provided an electronic still camera that has a reading mechanism and a control mechanism. The reading mechanism reads control data that is stored in a magnetic disk insertable in the electronic still camera. The control mechanism controls a photographing operation of the electronic still camera in accordance with the control data.

Further, according to an advantage of the present invention, a magnetic disk having a plurality of tracks for storing data is provided. The magnetic disk is characterized In that data for controlling a photographing operation is stored in at least one of the tracks.

Another advantage of the present invention resides in an electronic still camera that has a mounting mechanism, a reading mechanism, a determining mechanism, and a control mechanism. A magnetic disk is mountable in the mounting mechanism. The reading mechanism reads data stored in the magnetic disk. The determining mechanism determines whether the data is control data, and the control mechanism controls a photographing operation of the electronic still camera in accordance with the control data.

BRIEF DESCRIPTION OF THE DRAWINGS

The present invention will be better understood from the description of the preferred embodiments of the invention set forth below together with the accompanying drawings, in which:

FIG. 3 is a diagram of a program diagram;

DESCRIPTION OF THE PREFERRED EMBODIMENTS

Figure 1:
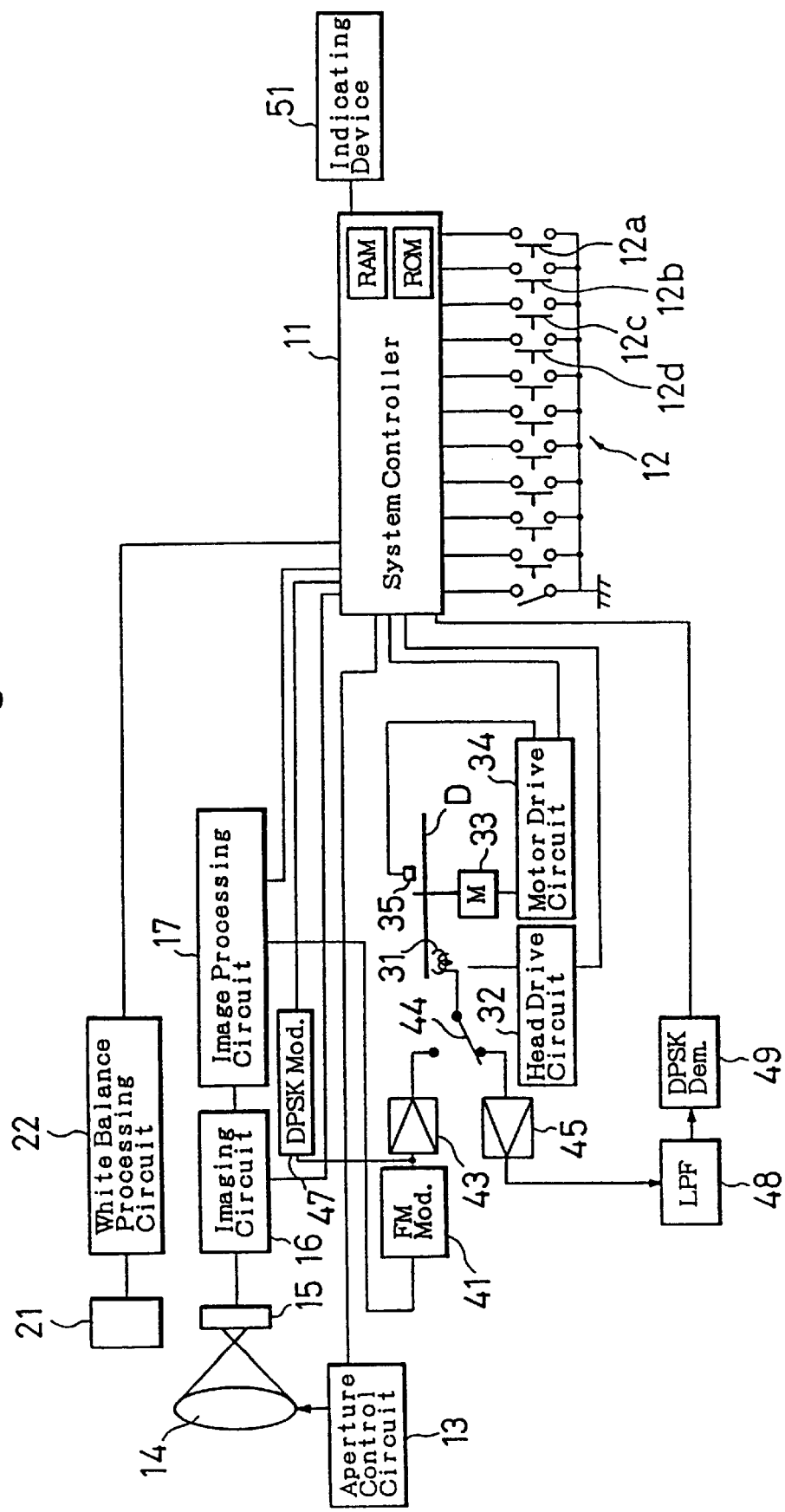
FIG. 1 is a block diagram of a control circuit of an embodiment of an electronic still camera according to the present invention.

The present invention will now be described with reference to embodiments shown in the drawings. Reference characters refer to the same parts throughout the various drawings.

Figure 2:
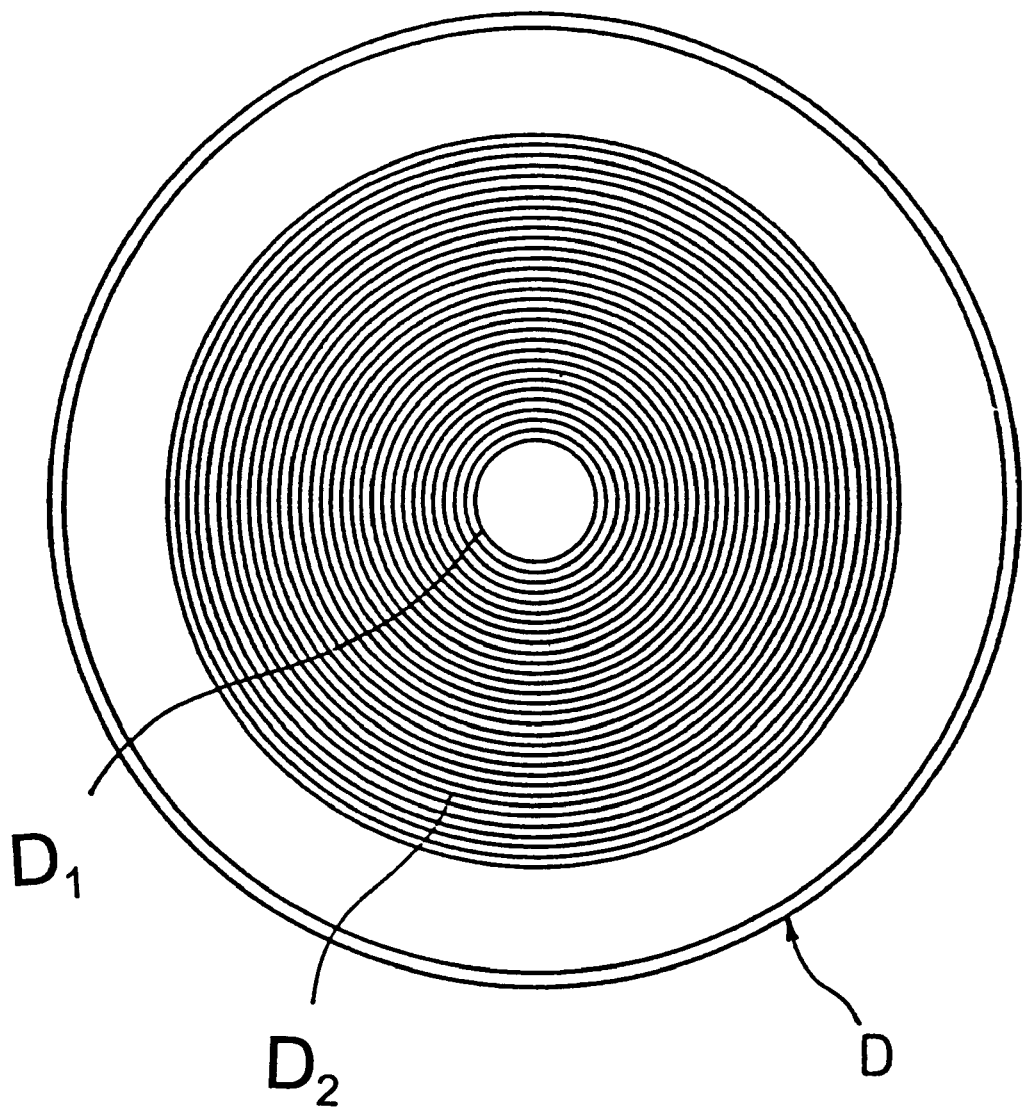
FIG. 2 is a schematic view of a magnetic disk.

FIG. 1 shows a control circuit of an embodiment of an electronic still Camera according to the present invention, and FIG. 2 shows a magnetic disk which is inserted to the electronic still camera.

The system controller 11 shown in FIG. 1, comprises a microcomputer that carries out a control of the whole electronic still camera. The system controller 11 is composed of a central processing unit (CPU), a read only memory (ROM) and a random access memory (RAM), and is connected to various operating switches 12. In a photography operation, an image of an object is formed on a CCD (Charge Coupled Device) 15 as a solid state imaging device through an aperture (not shown) and a lens 14. The CCD 15 is connected to an image processing circuit 17 through an imaging circuit 16. The imaging circuit 16 and the image processing circuit 17 are connected to and controlled by the system controller 11. An aperture control circuit 13 is also connected to and is controlled by the system controller 11, in accordance with information received from a not shown photometry device.

An image formed on the CCD 15 is inputted to the image processing circuit 17 through the imaging circuit 16. In the image processing circuit 17, the image signal inputted from the imaging circuit 16 is divided into differential color signals and a luminance signal; two differential color signals (R-Y, B-Y) being alternately arranged at each 1H (horizontal scanning period).

A white balance sensor 21 is connected to the system controller 11 through a white balance processing circuit 22, to ensure a correct color tone of a photographed image.

The disk drive device comprises a magnetic head 31, a head drive circuit 32 for driving and controlling the magnetic head 31, a spindle motor 33 for rotating a magnetic disk D, a motor drive circuit 34 for controlling the motor 33, and a PG coil 35 for sensing a rotation timing of the magnetic disk D. The PG coil 35 is connected to the motor drive circuit 34, and the motor drive circuit 34 and the head drive circuit 32 are connected to the system controller 11.

The luminance signal and the two differential color signals included in the image signal are frequency-modulated, respectively, and ID data, such as a photographing date, are DPSK modulated. The DPSK modulated signals corresponding to the ID data are multiplex recorded on a same track. To effect this operation, a frequency modulation circuit 41 is connected to the image processing circuit 17, and a DPSK modulation circuit 47 and a DPSK demodulation circuit 49 are connected to the system controller 11. The frequency modulation circuit 41 is connected to the magnetic head 31 through a head amplifier 43 and a switch 44; the DPSK modulation circuit 47 is connected to a point between the frequency-modulation circuit 41 and the head amplifier 43; and the DPSK demodulation circuit 49 is connected to the magnetic head 31 through a low pass filter (LPF) 48, a head amplifier 45, and the switch 44.

The switch 44 is selectively switched to a side of the DPSK modulation circuit 47 or a side of the DPSK demodulation circuit 49, under the control of the system controller 11. Namely, the switch 44 connects the head amplifier 43 of the frequency-demodulation circuit 41 to the magnetic head 31 when recording image data to the magnetic disk D, so that the image data is frequency-modulated, and ID data, such as a photographing date, are DPSK modulated and recorded on the magnetic disk D. Conversely, as described above, when the photographing control data stored in the magnetic disk D is written to the system controller 11, the switch 44 connects the head amplifier 45 of the DPSK demodulation circuit 49 to the magnetic head 31. Accordingly, the photographing control data stored in the magnetic disk D is DPSK demodulated and inputted to the system controller 11.

An indicating device 51 for indicating a present state of the camera is connected to the system controller 11.

Two types of the magnetic disk mounted in the disk device are known; namely, a conventional magnetic disk (referred to hereinafter as a usual disk), i.e., that for recording an image, and a magnetic disk of the embodiment according to the present invention, i.e., that for storing photographing control data (referred to hereinafter as a data disk).

FIG. 2 shows the magnetic disk D. This magnetic disk D has the same appearance as a 2-inch type magnetic disk used for a usual electronic still camera, and has 52 tracks. Although a 1st through 50th tracks $D_2$, counted from an outside edge of the disk D, are recording tracks used for recording image data, audio data, and digital data, such as a photographing date in a usual disk. Photographing control data, including an aperture and a shutter speed are differential-phase-shift-key (DPSK) modulated and stored in recording tracks $D_2$ in the embodiment of the present invention. Note that the 52nd track $D_1$ is a cue track in which, a cue signal is recorded. No signal is recorded in a 51st track.

It is noted that the modulation bands of the image data and the audio data are different. Accordingly, the image data and the audio data are recorded on different tracks. The cue signal is used to combine the image data with corresponding audio data when an image and sound are both reproduced.

In addition to an area for recording various information, the cue track $D_1$ is provided with a user's area which can be freely used by the user. In this embodiment, photographing control data for controlling a photographing operation of the electronic still camera are stored in the user's area.

FIG. 3 shows a relationship between an aperture and a shutter speed, using an EV (Exposure Value) as a parameter; i.e., FIG. 3 shows a program diagram S. On the data disk in the embodiment, bending points and end points of the program diagram in FIG. 3, i.e., data point P (8 points being shown in FIG. 3 by the symbol 0) are DPSK modulated and stored as photographing control data. The photographing control data stored on the data disk is written to the RAM of the system controller 11. In this embodiment, an intermediate value is obtained based on an inclination of a line between each point data P by an interpolation, so that an actual aperture and shutter speed according to the program diagram are obtained without lowering the accuracy of the process of the system controller 11.

One photographing control data described above is stored in one recording track. Usually, a plurality (for example, 12) of photographing control data are stored in one data disk. Namely, tracks corresponding to the number of data are used for storing the photographing control data. Note, in the ROM of the system controller 11, one program diagram, for example, is stored as the basic photographing control data.

Figure 4A:
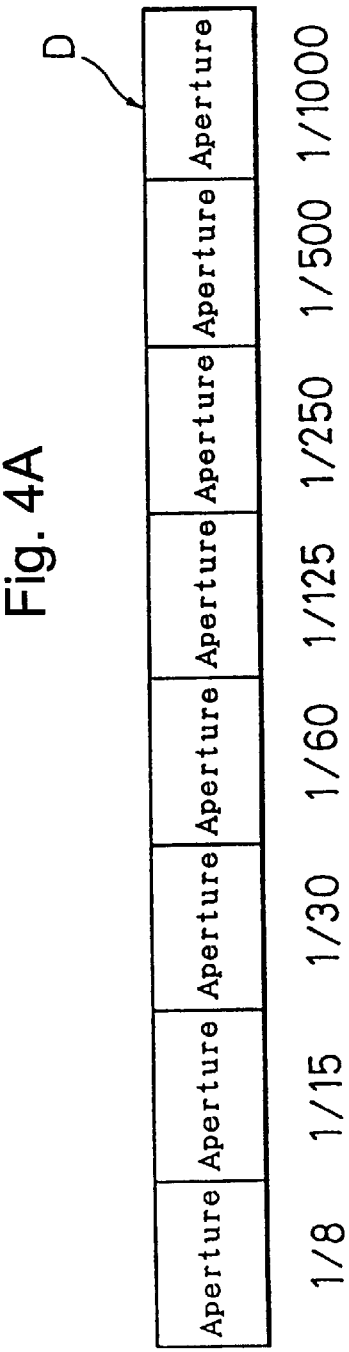
FIG. 4A is a diagram showing an example of a photographing control data stored in the recording track.
Figure 4B:
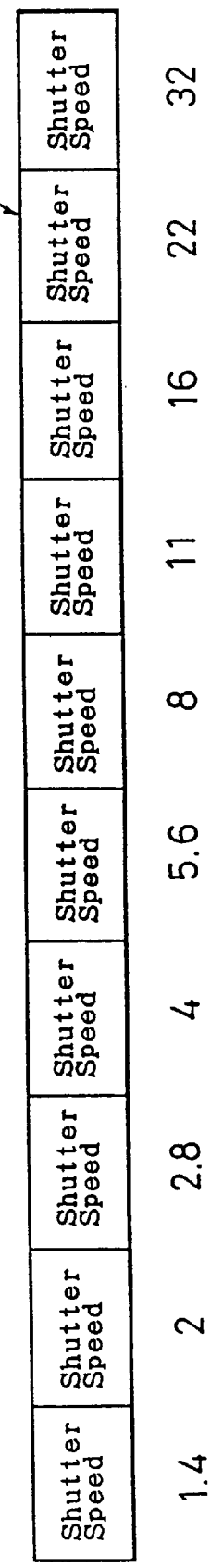
FIG. 4B is a diagram showing another example of the photographing control data stored in the recording track.

FIGS. 4A and 4B show examples of the photographing control data stored in the recording track.

In the example shown in FIG. 4A, eight kinds of shutter speeds (i.e.; 1/8, 1/15, . . . , 1/1000) are stored in the ROM of the system controller 11. Apertures corresponding to these shutter speeds are DPSK modulated and sequentially stored in the data disk D. In this embodiment as many as ten different apertures can be stored in the RAM of the system controller 11. Therefore, 4 bits are sufficient for denoting all of the different apertures. In the example shown in FIG. 4A, eight different aperture values, which correspond to the number of shutter speed values stored in the ROM of the system controller 11, are DPSK modulated and stored. Accordingly, 8×4=32 bits are used to store the photographing control data.

On the other hand, in the example shown in FIG. 4B, ten different aperture values (i.e.; 1.4, 2, 2.8, . . . 32) are stored in the ROM of the system controller 11. Shutter speeds corresponding to these aperture values are DPSK modulated and sequentially stored in the data disk D. In this embodiment, as many as eight different shutter values can be stored. Therefore, 3 bits are sufficient for denoting all of the different shutter speeds. As mentioned above, ten aperture values are stored in the ROM of the system controller 11. Accordingly, 3×10=30 bit are used to store the photographing control data in the example shown in FIG. 4B.

In addition to this program diagram, data denoting a designation of a zooming range, data denoting a designation of an exposure mode, and data denoting a designation of an automatic focusing (AF) mode can be stored in the data disk as the photographing control data, respectively. For the zooming range, parameters showing the width of the zooming range are stored in the data disk, and the system controller 11 determines a zooming range by reading these parameters. Similarly, when designating the exposure mode and the AF mode, the system controller 11 reads the parameters from the data disk and carries out a predetermined designation.

Note that the embodiment is constructed in such a manner that data of each of the program diagram, the designation of the zooming range, the designation of the exposure mode, and the designation of the AF mode is written to a different area in the RAM of the system controller 11. Furthermore, note that in comparison with the photographing control data, such as the program diagram, a lesser number of bits can be used for denoting photographing control data, such as the zooming range. Therefore, data for judging a kind of photographing control data is included in the photographing control data other than the program diagram. The cpu of the system controller 11, based on whether or not this judging data is included in the photographing control data, and based on the kind of judging data, writes each data to a different area in the RAM of the system controller 11.

As described above, the amount of each of the photographing control data is small, i.e., 32 bits at most, but the data capacity of a user's area in a magnetic disk in which DPSK modulated data can be recorded is 54 bits per one track of the magnetic disk. Therefore, the capacity is large enough to store all of the photographing control data. Accordingly, the user's area used for recording the photographing control data amounts to 24 bits or 22 bits, and stores information denoting the function of the photographing control data, which information is DPSK modulated. The system controller 11 recognizes the function of the photographing control data based on this information, and produces an indication of a numeral, a symbol or a figure corresponding to that function.

Figure 5:
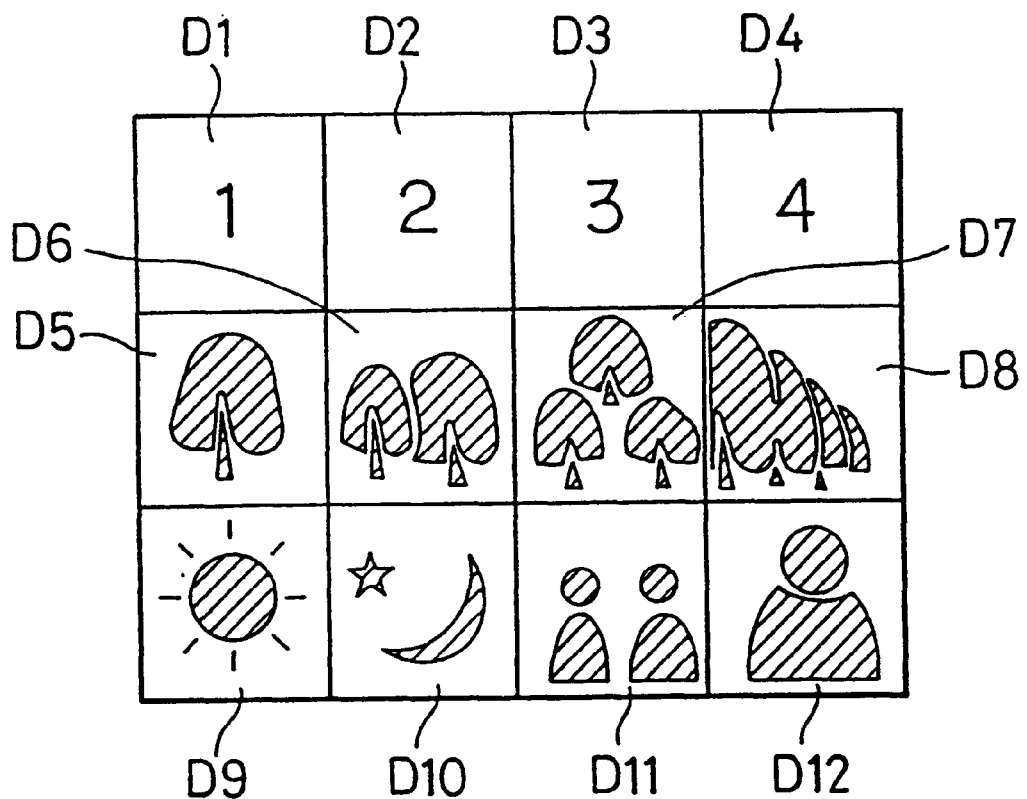
FIG. 5 is a diagram showing an example of figures indicated by an indicating device, the figures denoting functions of the photographing control data.

FIG. 5 shows functions of the photographing control data indicated by the indicating device 51, i.e., a numeral figure, a symbol or a figure as shown in this drawing are shown on a display surface of the indicating device 51. When one of the photographing control data is selected, a lamp provided at a position corresponding to the selected photographing control data is lit, whereby the corresponding numeral, symbol or figure is indicated.

Numerals 1 through 4 shown by references DI through D4 each denote a program diagram, and the figures shown by references D5 through D7 each denote a zooming range; reference D5 shows an 80 through 105 mm zooming range, reference D6 shows a 50 through 80 mm zooming range, and reference D7 shows a 35 through 50 mm zooming range. The figures shown by references D9 and D10 each denote an exposure mode, and show a usual mode and a night photographing mode, respectively. The figures shown by references D8, D11 and D12 each denote an AF mode, and show a fixed focus, a usual mode and a macro mode, respectively.

In this embodiment, one of the program diagrams (references D1 through D4), one of the zooming ranges (references D5 through D7), one of the exposure modes (references D9 and D10), and one of the AF modes (references D8, D11 and D12) can be selected, respectively.

This embodiment is constructed in such a manner that four different program diagrams can be selected. Accordingly, since 4 bits are needed for indicating the numerals 0 through 9, 16 bits are needed for indicating four different program diagrams by the numerals. Three different zooming ranges can be selected. Therefore, 2 bits are needed for indicating the zooming ranges. Two different exposure modes can be selected. Therefore, 2 bits are needed for indicating the exposure modes. Three different AF modes can be selected. Therefore, 2 bits are needed for indicating the AF modes. Accordingly, in a user's area in which DPSK modulated data can be written, 22 bits are used for indicating the photographing control data.

Figure 6:
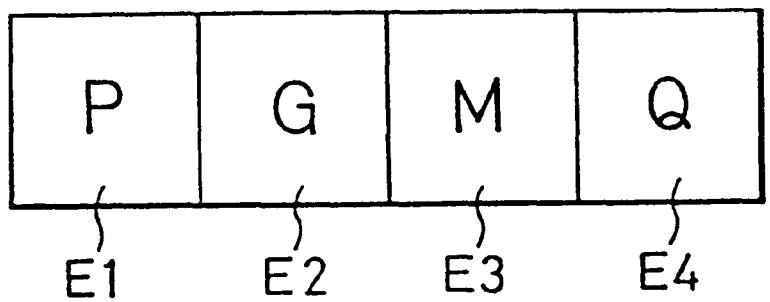
FIG. 6 is a diagram showing another example of figures indicated by an indicating device.

Although FIG. 5 shows, as an example, numerals, symbols and figures indicating the functions of the photographing control data, the present invention is not restricted to this example. Namely, as shown in FIG. 6, the photographing control data can be indicated alphabetically. in this example, a portion indicated by reference E1 shows a program diagram, a portion indicated by reference E2 shows a zooming range, a portion indicated by reference E3 shows an exposure mode, and a portion indicated by reference E4 shows an AF mode, respectively. To indicate the full alphabet from "A" to "ZT", 5 bits are needed. Accordingly, to indicate four different photographing control data, 20 bits are used in the user's area of the magnetic disk.

Figure 7:
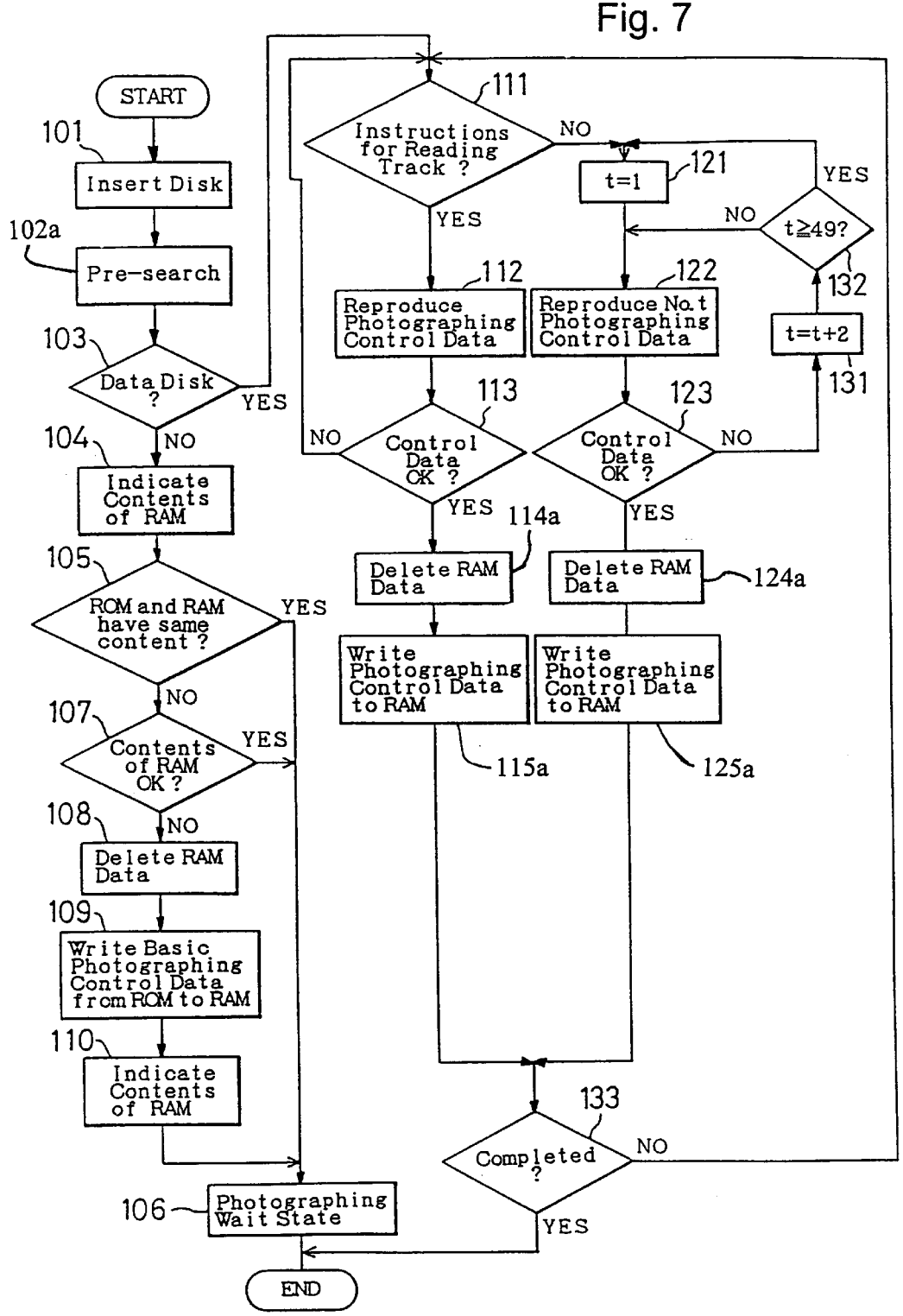
FIG. 7 is a flow chart showing a preparation process for a photographing operation by the electronic still camera.

FIG. 7 is a flow chart showing an operation of the electronic still camera.

In step 101, a magnetic disk is inserted into the disk drive device of the electronic still camera, and in step 102, a pre-search of the magnetic disk is carried out, whereby data stored in each track is read. In step 103, in accordance with the pre-search of step 102a, it is determined whether the magnetic disk set in the camera is a data disk, i.e., it is determined whether photographing control data is stored on this magnetic disk. When the magnetic disk is a data disk, step 111 and following steps are carried out, but when the magnetic disk is a usual disk, steps 104 through 109 are carried out.

A case in which the usual disk is currently set in the disk drive device is described below. Where a data disk was previously set, and step 111 and the following steps thereof have been carried out, the photographing control data is stored in the RAM of the system controller 11. Conversely, where step 111 and the following steps have not been carried out, a program diagram, for example, which is pre-stored in the ROM as the basic photographing control data, is stored in the RAM. In step 104, the present contents of the RAM are indicated by the indicating device 51. In more detail, the numerals denoting the content of the photographing control data are stored in the RAM, and one of the numerals corresponding to the photographing control data is indicated in step 104.

In step 105, it is determined whether the photographing control data stored in the RAM is the same as the basic photographing control data stored in the ROM of the system Controller 11. When these data are the same, the process goes to step 106, which is a photographing wait state, and thus a photographing operation in accordance with the basic photographing control data currently stored in the RAM becomes possible.

Conversely, when it is determined in step 105 that the photographing control data stored in the ROM and the RAM are different, it is determined in step 107 whether the photographing control data currently stored in the RAM should be used for the photographing operation. This determination is carried out by an operation in which the photographer operates an operation switch 12a in accordance with the indication by the indicating device 51, for example.

When a photographing operation is carried out by using the photographing control data currently stored in the RAM, the process goes to step 106. Conversely, when the photographing is not carried out by using the photographing control data currently stored in the RAM, the process goes to step 108 and the data stored in an area of the RAM in which data is written in step 109 will be stored are deleted. Then, the basic photographing control data stored in the ROM is written to the RAM in step 109, and in step 110, the content of the RAM is indicated. In step 110, the indicating device 51 does not indicate a numeral (shown by references D1 through D4 in FIG. 5), which means that the basic photographing control data is stored in the RAM. Step 106 is a photographing wait state, in which a photographing operation by the basic photographing control data newly stored in the RAM can be carried out. In this state, when the shutter button of the camera is released, a photographing operation in accordance with the basic photographing control data is carried out.

On the other hand, in step 103, if it is determined that a data disk is mounted in the disk drive device, step 111 and following steps are carried out.

First, in step 111, it is determined which track of the magnetic disk is to be read. The instruction for this reading is given by an operation of the operating switch 12b by the photographer. When an instruction for reading a track is given, in step 112, the photographing control data stored in the designated track is reproduced by the DPSK demodulation circuit 49, and the figure or the like (FIG. 5) denoting the function of the photographing control data is indicated by the indicating device 51.

Then, in step 113a, based on the indication of the indicating device 51, the photographer determines whether the photographing control data is as required, and operates the operating switch 12a. When it is determined that the present photographing control data is not as required, the process returns again to step 111, and the operation of selecting the photographing control data is repeated. Conversely, when it is determined that the present photographing control data is as requested, steps 114a and 115a are carried out.

In step 114a, the photographing control data currently stored in the RAM of the system controller 11, that is, the data corresponding to the photographing control data reproduced in step 112, is deleted. Namely, for example, a program diagram is reproduced as the photographing control data in step 112, the program diagram which his been prestored in the RAM is deleted in step 114a. Then, in step 115a, the photographing control data (for example, a program diagram) reproduced in step 112 is read to the RAM of the system controller 11.

In step 133, it is determined whether the operation of selecting the photographing control data has been completed. This is carried out by an operation of the operation switch 12c by the photographer. When the operation of selecting the photographing control data has been completed, this routine is ended, but when the operation of selecting the photographing control data has not been completed, the process returns again to step 111. For example, when a program diagram has been selected but in a previous operation for selecting the photographing control data, a designation of a zooming range, for example, can be carried out by designating a predetermined track in step 111 in the next operation of selecting the photographing control data.

By carrying out such an operation, the photographing control data of each of the program diagram, the designation of the zooming range, the designation of the exposure mode, and the designation of the RF mode is stored in the RAM of the system controller 11. Note, it is not necessary to read all of these data from a data disk; i.e., instead of the photographing control data being read from the data disk, data pre-stored in the ROM of the system controller 11 can be used.

On the other hand, in step 111, when it is determined that instructions for which track of the magnetic disk should be read are not given, step 121 and the following steps are carried out, and photographing control data is reproduced at each track; and it is determined whether the photographing control data is or not as required, as described below.

In step 121, a counter "t" is set to "1", and in step 122, the photographing control data stored in No. "t" track is reproduced by the DPSK demodulation circuit 49, and a figure or the like (FIG. 5) denoting the function of the photographing control data is indicated by the indicating device 51. Then, in step 123a, based on the indication of the indicating device 51, the photographer determines whether the photographing control data is as required, and operates the operating switch 12a accordingly. When it is determined that the present photographing control data is as required, steps 124a and 125a are carried out. These steps are the same as steps 114a and 115a. In these steps, photographing control data currently stored in the RAM of the system controller 11 is deleted, and new photographing control data are read into the RAM.

In step 123a, when it is determined that the present photographing control data is not as required, the process goes to step 131, in which the counter "t" is increased by "2", and in step 132 it is determined whether the counter "t" has become more than or equal to "49". If the counter "t" is less than "49", steps 122 and 123a are again carried out. Namely, the next photographing control data are reproduced, and it is determined whether or not this photographing control data is as required. Note, the counter "t" is increased by "2" at step 131 because the photographing control data is stored on every other track.

On the other hand, when it is determined in step 132 that the counter "t" is more than or equal to "49", the process returns to step 121 and the counter "t" is set to "1", and then steps 122 and the following steps are again carried out.

As described above, since the embodiment is constructed in such a manner that steps 122, 123a, and 131 are carried out until it is determined that the counter "t" has reached "49" in step 132, one data disk can store 25 different photographing control data. In the example described with reference to FIG. 5, however, since twelve photographing control data are used, the routine may be constructed in such a manner that steps 122, 123a and 131 are carried out until it is determined that the counter "t" has reached "25" in step 132.

After carrying out step 125a, the process goes to step 133, and it is determined whether the operation of selecting the photographing control data has been completed, as described above. Namely, when it is determined that the operation of selecting the photographing control data has been completed, the routine is ended, and when it is determined that the operation of selecting the photographing control data has not been completed, the process returns to step 111.

Therefore, after the photographing control data has been read to the RAM of the system controller 11, the photographer can set a usual disk to the disk drive device and carry out a photographing operation in accordance with the selected photographing control data. When a change of the photographing control data is required, the data disk is again set in the disk drive device and the above-described operations carried out.

Note that step 113a, in which it is determined whether or not the reproduced photographing control data is as required, may be omitted, and step 114a carried out immediately after step 112 has been carried out.

As described above, this embodiment is constructed in such a manner that a photographing operation can be carried out in accordance with the photographing control data stored in recording tracks of the magnetic disk. Since 25 different photographing control data, for example, can be stored on one data disk, a photographing operation can be carried out in accordance with photographing control data that is different from the basic photographing control data stored in the ROM of the system controller. Thus, various photographing operations can be carried out. Furthermore, since the photographing control data is obtained from the magnetic disk, the camera does not require an exclusive operating mechanism for storing the photographing control data. Accordingly, the construction of the camera is simplified.

Further, the embodiment is constructed in such manner that the photographing control data is DPSK modulated and stored in the magnetic disk. Therefore, basically only the DPSK modulation circuit 49 is needed as a reproducing circuit for reading the photographing control data stored in the magnetic disk. Since a DPSK modulation is carried out in a low frequency band, the DPSK modulation circuit 49 has a simple construction. Therefore, the construction of the control circuit (FIG. 1) in this embodiment is very simple and can be manufactured at a low price.

Although the photographing control data is stored in the ROM of the system controller in a conventional camera, the photographing control data are obtained from the magnetic disk in this embodiment. Therefore, the ROM for storing the photographing control data need not be housed in the camera, or an area in the ROM for storing the photographing control data can be deleted.

Figure 8:
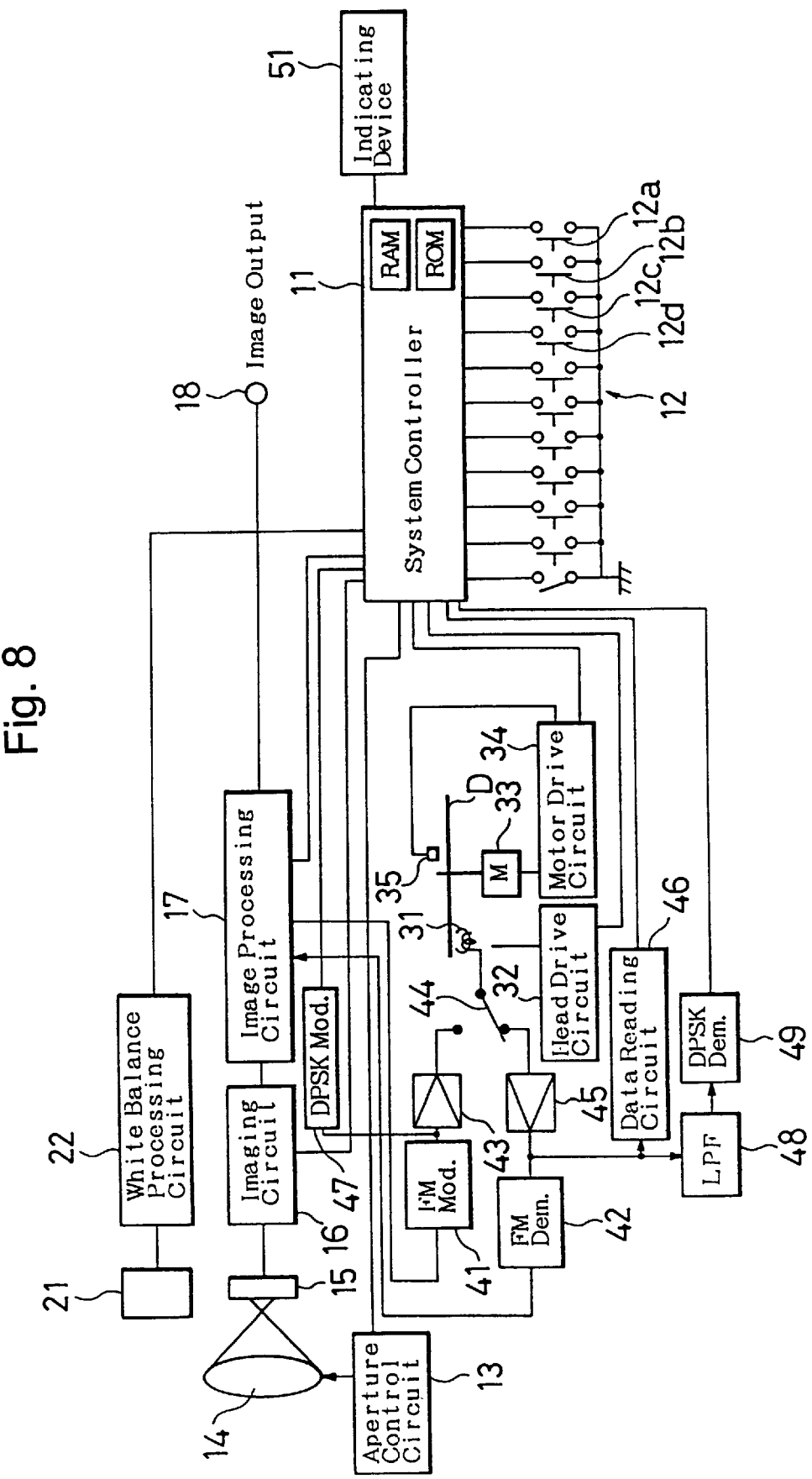
FIG. 8 is a block diagram of a control circuit of a second embodiment of an electronic still camera according to the present invention.

FIG. 8 shows a control circuit of a second embodiment of an electronic still camera of the present invention. The control circuit of the second embodiment differs from the control circuit of the first embodiment by the addition of an image output terminal 18 and a data reading circuit 46.

The image output terminal is connected to the image processing circuit 17, so that the photographed image can be observed by connecting a reproducing device (not shown) to the image output terminal.

In the second embodiment, the luminance signal and the two differential color signals included in the image signal are frequency-modulated, respectively, and ID data, such as a photographing date, are differential-phase-shift-keying-modulated (DPSK-modulated). DPSK-modulated signals corresponding to ID data are multiplex-recorded on a same track. To effect this operation, the frequency-modulation circuit 41 and the frequency-demodulation circuit 42 are connected to the image processing circuit 17, and the DPSK modulation circuit 47 and the DPSK demodulation circuit 49 are connected to the system controller 11. The frequency-modulation circuit 41 is connected to the magnetic head 31 through the head amplifier 43 and the switch 44. The frequency-demodulation circuit 42 is connected to the magnetic head 31 through the head amplifier 45 and the switch 44. The DPSK modulation circuit 47 is connected to a point between the frequency-modulation circuit 41 and the head amplifier 43. The DPSK demodulation circuit 49 is connected to a point between the frequency-demodulation circuit 42 and the head amplifier 45, through the low pass filter (LPF) 48.

The switch 44 is selectively switched to a side of the frequency-modulation circuit 41 or a side of the frequency-demodulation circuit 42, under the control of the system controller 11. Namely, the switch 44 connects the head amplifier 43 of the frequency-demodulation circuit 41 to the magnetic head 31 when recording the image data to the magnetic disk D, whereby the image data is frequency-modulated, and ID data, such as a photographing date, are DPSK-modulated and recorded on the magnetic disk D. Conversely, when an image recorded on the magnetic disk D is reproduced, the switch 44 connects the head amplifier 45 of the frequency-demodulation circuit 42 to the magnetic head 31. Therefore, the image data recorded on the magnetic disk D is frequency-demodulated and inputted to the image processing circuit 17, whereby the image can be reproduced by a reproducing device connected to the image output terminal 18. Data, such as a photographing date, are DPSK-demodulated and inputted to the system controller 11, whereby the photographing date 13 is reproduced together with the image.

In the second embodiment, as described later, photographing control data, including an f-number and a shutter speed, are stored in a cue track of the magnetic disk D. A data reading circuit 46 reads the photographing control data 13 connected to a point between the frequency-demodulation circuit 42 and the head amplifier 45. The data reading circuit 46 is also connected to the system controller 11, which analyzes the control data, whereby a photographing operation of the camera is controlled.

Figures 9, 10:
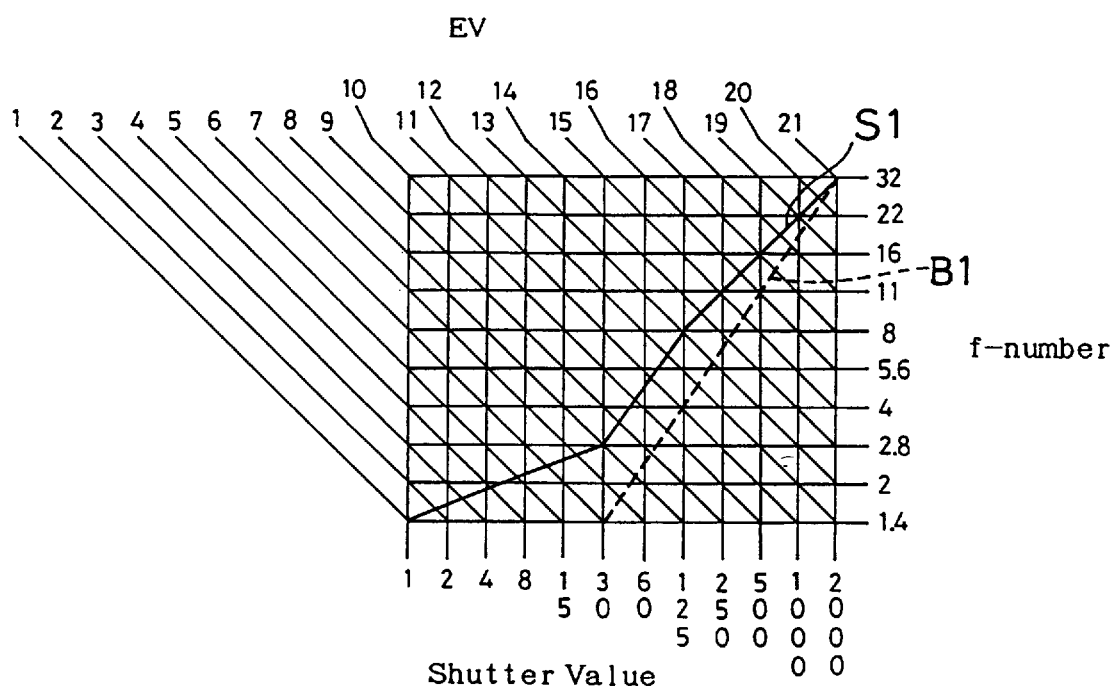
FIG. 9 is a diagram of a program diagram used by with the second embodiment.
FIG. 10 is a schematic view showing photographing control data used with the second embodiment.

FIG. 9 shows a program diagram as an example of the photographing control data. This photographing control data defines a relationship between an f-number and a shutter value, using an EV (Exposure Value) as a parameter, and is indicated by a solid line S1. A program diagram, shown by a broken line B1, is stored in a ROM of the system controller 11 as basic photographing control data. Although the EV, the f-number and the shutter value are recorded in a table in this embodiment, an equation for obtaining the f-number and the shutter value based on the EV may be stored in the magnetic disk.

FIG. 10 shows a state of the photographing control data stored in the cue track. This control data comprises an alternate arrangement of an EV, an f-number, and a shutter value. One point on the solid line S1 of FIG. 9 is indicated by a set of the EV, the f-number and the shutter value. Information denoting a photographing operation, such as a shutter speed priority mode, may be stored at the beginning (or at the end) of the data shown in FIG. 10, in the form of a bit, for example.

Figure 11:
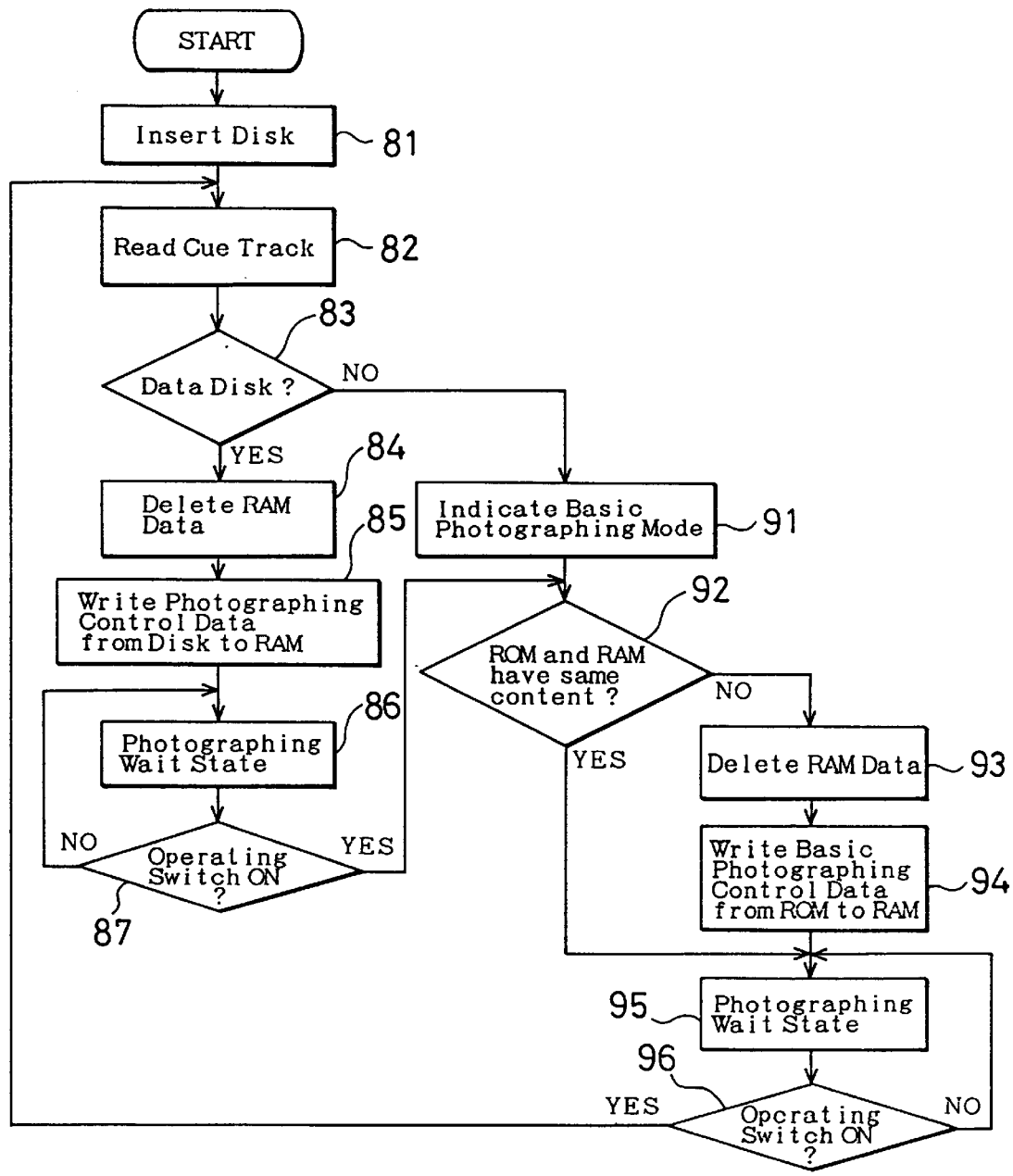
FIG. 11 is a flowchart showing a first example of a preparation for a photographing operation by the electronic still camera of FIG. 8.

FIG. 11 is a flowchart showing an operation of the electronic still camera of the second embodiment. Note that in this embodiment, the basic photographing control data 13 is stored in the RAM of the system controller 11.

Hereinafter, a disk that stores photographing control data in a cue track is referred to as a data disk, while a conventional disk that does not store photographing control data is referred to as a usual disk.

In step 81, a magnetic disk is inserted into the disk drive device of the electronic still camera, and in step 82, data in the cue track of the magnetic disk is read. Then, in accordance with the data read in step 82, step 83 determines whether photographing control data is stored in the cue track. Thus, step 83 determines whether a data disk is set in the disk drive device.

When a data disk is set in the disk drive device, steps 84 through 87 are performed. Specifically, photographing control data stored in a RAM of the system controller 11 are deleted (step 84), and photographing control data stored in the cue track of the magnetic disk, i.e. the program diagram (data indicated by the solid line S1 in FIG. 9) is written to the RAM of the system controller 11 (step 85). Step 86 is a photographing wait state, in which a photographing operation in accordance with the photographing control date stored in the RAM, i.e. the photographing control data recorded in the cue track of the magnetic disk, is possible. In this state, if a shutter button of the camera is released, a photographing operation in accordance with the diagram shown by the solid line S1 in FIG. 9 is performed.

In step 87, it is determined whether operating switch 12a of the camera has been operated. Operating switch 12a is provided for selecting whether photographing control data read from the cue track of the magnetic disk or the basic photographing control data previously stored in the ROM of the system controller 11 is to be used as a program diagram for a photographing operation. If operating switch 12a has not been operated, the process returns to step 86, and thus, a photographing mode using photographing control data read from the cue track, i.e. an optional photographing mode, is maintained. Conversely, in step 87, if it is determined that operating switch 12a has been operated, step 92 and the following steps are performed, whereby the mode is changed to a photographing mode using the basic photographing control data previously stored in the ROM of the system controller 11, i.e. a basic photographing mode is maintained.

When it is determined that a data disk is not set in the disk drive device in step 83, i.e., when a usual disk is set in the disk drive device, step 91 and the following steps are carried out. In Specifically, in the RAM of the system controller 11. a program diagram shown by the broken line B1 in FIG. 9, for example, usually, is stored as the basic photographing control data. Therefore, in step 91, the indicating device 51 indicates that the camera is now set to carry out a photographing operation in accordance with the basic photographing control data, i.e. the basic photographing mode is maintained.

Step 92 is performed to determine whether the photographing control data stored in the ROM of the system-controller 11 coincides with the photographing control data stored in the RAM. If these photographing control data are the same, the process goes to step 95, which is a photographing wait state, and thus, a photographing operation in accordance with the basic photographing data currently stored in the RAM is possible. Conversely, if it is determined in step 92 that the photographing control data stored in the ROM and the RAM are different, step 93 is executed and the data stored in the RAM is deleted, and then, in step 94, the basic photographing control data stored in the ROM is written to the RAM. Thereafter, in step 95, the camera is held in a photographing wait state in which a photographing operation by the basic photographing control data that is newly stored in the RAM can be carried out. In this state, if the shutter button of the camera is released, a photographing operation in accordance with the diagram indicated by the broken line B1 in FIG. 9 is performed.

At step 96, as in step 87, a determination is made as to whether the operating switch 12a has been operated. If operating switch 12a has not been operated, the process returns to step 95. Thus, a photographing mode using the basic photographing control data stored in the RAM in the present state, i.e. the basic photographing mode, is maintained. On the other hand, if it is determined at step 96 that the operating switch 12a has been operated, step 82 and the following steps are executed, and if a data disk has been set in the disk drive device, the photographing mode is changed to the optional photographing mode. Note that in a case where it is determined in step 96 that the operating switch 12a has been operated, but a data disk is not set in the disk drive device, the photographer can recognize that a data disk is not set, by an indication of the basic photographing mode indicated in step 91.

In an electronic still camera which is not provided with the operating switch 12a, steps 87 and 96 are omitted. In such a case, the photographing mode is definitely determined by whether the inserted magnetic disk is a data disk or a usual disk. Therefore, all image data recorded in data tracks of the magnetic disk are photographed in accordance with the same photographing control data.

As described above, the electronic still camera of the second embodiment can be operated using both a data disk and a usual disk. However, when the electronic still camera of the present invention is to be operated only by a data disk, the flowchart of FIG. 11 consists only of steps 81, 82, 84, 85 and 86.

In the embodiment described above, a photographing operation can be carried out by photographing control data stored in the cue track of the magnetic disk. Therefore, a photographing operation can be carried out in accordance with photographing control data that is different from the basic photographing control data stored in the ROM of the system controller. Thus, various photographing operations become possible. Further, since such photographing data can be obtained from the magnetic disk, it is not necessary to provide the camera with a special operating mechanism, and therefore, the construction of the camera is greatly simplified.

Further, although the photographing control data can be stored in the ROM of the system controller in a conventional camera, the photographing control data is obtained from the magnetic disk in this embodiment. Accordingly, the ROM for storing the photographing control data need not be housed In the camera.

In addition, since the embodiment is constructed in such a manner that the photographing control data is obtained from the magnetic disk, only a magnetic disk having control data that corresponds to the object needs be selected to choose a required photographing condition, which simplifies the operation of the camera.

A volume of the cue track of the magnetic disk is about 16K bytes, which is large enough to store the photographing control data. The data reading circuit 46 for reading the data of the cue track is easily achieved using an integrated circuit, and thus, a particularly complicated construction is not required.

The above explanation of the present invention has been simplified by omitting a description of a construction for recording sound. When sound is to be recorded together with an image, an audio processing circuit is added to the circuit shown in FIG. 8.

In the above-described second embodiment, photographing control data are stored in the cue track $D_1$. However, in another embodiment of the present invention, the photographing control data, such as, for example, an f-number and a shutter speed, are stored in data tracks $D_2$ (FIG. 2) and information indicating that the magnetic disk D is a data disk storing photographing control data is stored in the cue track $D_1$. The contents recorded in the tracks of the magnetic disk D differ in accordance with whether the magnetic disk D is a usual disk or a data disk, and the circuit components operating in accordance with the magnetic disk D are different. Namely, in this embodiment, it is not necessary to determine whether the magnetic disk D is a data disk, because only predetermined certain circuits are operated in accordance with the kind of reproducing signal inputted from the magnetic head 31.

Further, in this embodiment, a plurality of program diagrams, shown by the solid line S1 in FIG. 9 are stored in the data tracks $D_2$.

Figure 12:
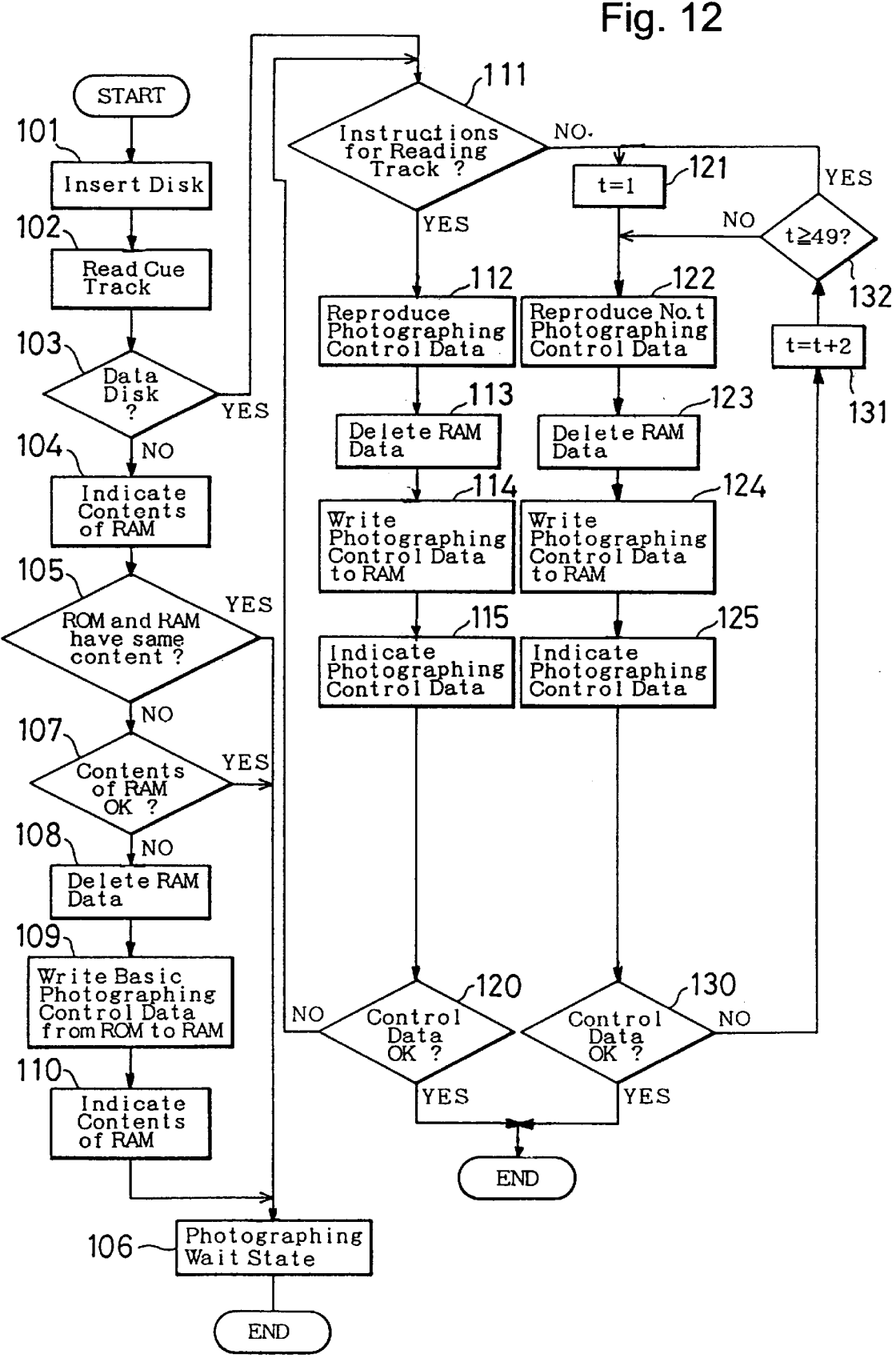
FIG. 12 is a flowchart showing a second example of a preparation for a photographing operation by the electronic still camera of FIG. 8.

FIG. 12 shows a flowchart of an operation of the electronic still camera according to the second embodiment. This flowchart is similar to the flowchart illustrated in FIG. 7 with respect to the first embodiment.

In step 101, illustrated in FIG. 12, a magnetic disk is inserted into the disk drive device of the electronic still camera, and, in step 102, data in the cue track of the magnetic disk is read. In accordance with the data read in step 102, step 103 determines whether the magnetic disk inserted into the camera is a data disk. That is, it is determined whether photographing control data are stored in this magnetic disk. When the magnetic disk is determined to be a data disk, step 111 and the following steps are executed. However, when the magnetic disk is determined to be a usual disk, steps 104 through 109 are executed.

If a data disk has been inserted into the camera, and step 111 and the following steps have been executed, the program diagram shown by the solid line S1 in FIG. 9 is stored In the RAM of the system controller 11. On the other hand, if step 111 and the following steps have not been executed, the program diagram shown by the broken line B1 in FIG. 9, for example, is stored as the basic photographing control data. Then, in step 104, the present contents of the RAM is indicated by the indicating device 51.

In step 105, it is determined whether the photographing control data stored in the ROM of the system controller 11 is the same as the photographing control data stored In the RAM. When these data are the same, the process goes to step 106, which is a photographing wait state. Thus, a photographing operation in accordance with the photographing control data stored in the RAM becomes possible.

When it is determined in step 105 that the photographing control data stored in the ROM and the RAM are different, it is determined in step 107 whether the photographing control data currently stored in the RAM should be used for the photographing operation. This determination is carried out, for example, by an operation in which the photographer operates the operation switch 12b in accordance with the indication by the indicating device 51.

When a photographing operation is carried out using the photographing control data currently stored in the RAM, execution goes to step 106. Conversely, when the photographing is not carried out using the photographing control data currently stored in the RAM, the process goes to step 108, and the data stored in the RAM is deleted. Then, the basic photographing control data stored in the ROM is written to the RAM in step 109, and in step 110, the content of the RAM is indicated. Step 106 is the photographing wait state in which a photographing operation by the basic photographing control data newly stored in the RAM can be carried out. In this state, when the shutter button of the camera is released, a photographing operation is performed in accordance with the diagram shown by the broken line B1 in FIG. 9.

On the other hand, if it is determined in step 103 that a data disk is mounted in the disk drive device, step 111 and the following steps are executed. Step 111 is performed to determine which track of the magnetic disk is to be read. The instruction for this reading is given by an operation of the operating switch 12b by the photographer. When an instruction for reading a track is given, the photographing control data stored in the designated track is reproduced by the data reading circuit 46 (step 112), and the photographing control data stored in the RAM of the system controller 11 is deleted. Then, in step 114, the photographing control data reproduced in step 112 is written to the RAM of the system controller 11.

The content of the photographing control data currently stored in the RAM is indicated at step 115 by, for example, the indicating device 51. Accordingly, the photographer can read the photographing control data, determine whether the present photographing control data is acceptable, and operate the operating switch 12b accordingly. When it is determined by the photographer that the present photographing control data is acceptable, the process is ended. Conversely, when it is determined by the photographer that the present photographing control data is not acceptable, step 111 and the following steps are re-executed.

On the other hand, when it is determined in step 111 that an instruction for which track of the magnetic disk to be read has not been given, step 121 and the following steps are carried out, whereby the photographing control data are reproduced and it is determined whether the photographing control data is acceptable.

Specifically, a counter "t" is set to "1" in step 121. Then, in step 122, the photographing control data stored in No."t" track is reproduced by the data reading circuit 46. Steps 123, 124 and 125 are the same as steps 113, 114 and 115. Namely, the photographing control data stored in the RAM of the system controller 11 until that time are deleted, new photographing control data is written to the RAM, and the content of the photographing control data stored in the RAM is then indicated by the indicating device 51. In step 130, it is determined by the photographer whether the present photographing control data is acceptable. If the data is acceptable, the process comes to an end.

When it is determined in step 130 that the present photographing control data is not acceptable, the process goes to step 131, where the counter "t" is increased by "2". Then, step 132 is executed to determine whether counter "t" has become more than or equal to "49". If the counter is less than "49", steps 122 through 130 are re-executed. That is, the next photographing control data is reproduced, and it is determined whether this photographing control data is acceptable. Note that in this embodiment, the counter "t" is increased by "2" in step 131 because the photographing control data is stored on every other track of the disk.

When it is determined in step 132 that the counter "t" is more than or equal to "49", the process returns to step 121, wherein the counter "t" is set to "1" and steps 122 through 130 are re-executed.

Thus, after the photographing control data is written to the RAM of the system controller 11, the photographer inserts a usual disk into the disk drive device and carries out a photographing operation in accordance with the selected photographing control data. When the photographer wishes to change the photographing control data, the data disk is reinserted into the disk drive device, and the above-described operation is carried out.

As described above, this embodiment is constructed in such a manner that a photographing operation can be carried out in accordance with the photographing control data stored in data tracks of the magnetic disk. Since, for example, 25 kinds of photographing control data can be stored on one data disk, a photographing operation can be carried out in accordance with photographing control data different from the basic photographing control data stored in the ROM of the system controller, and thus, various photographing operations can be carried out. Further, since the photographing control data is obtained from the magnetic disk, the camera does not require an exclusive operating mechanism for storing the photographing control data. Accordingly, the construction of the camera is simplified.

Although the photographing control data is obtained from the ROM of the system controller in a conventional camera, the photographing control data is obtained for the present invention from the magnetic disk. Therefore, the ROM for storing the photographing control data need not be housed in the cameras. Alternatively, an area in a ROM in a camera normally reserved for storing photographing control data can be deleted.

Figure 13:
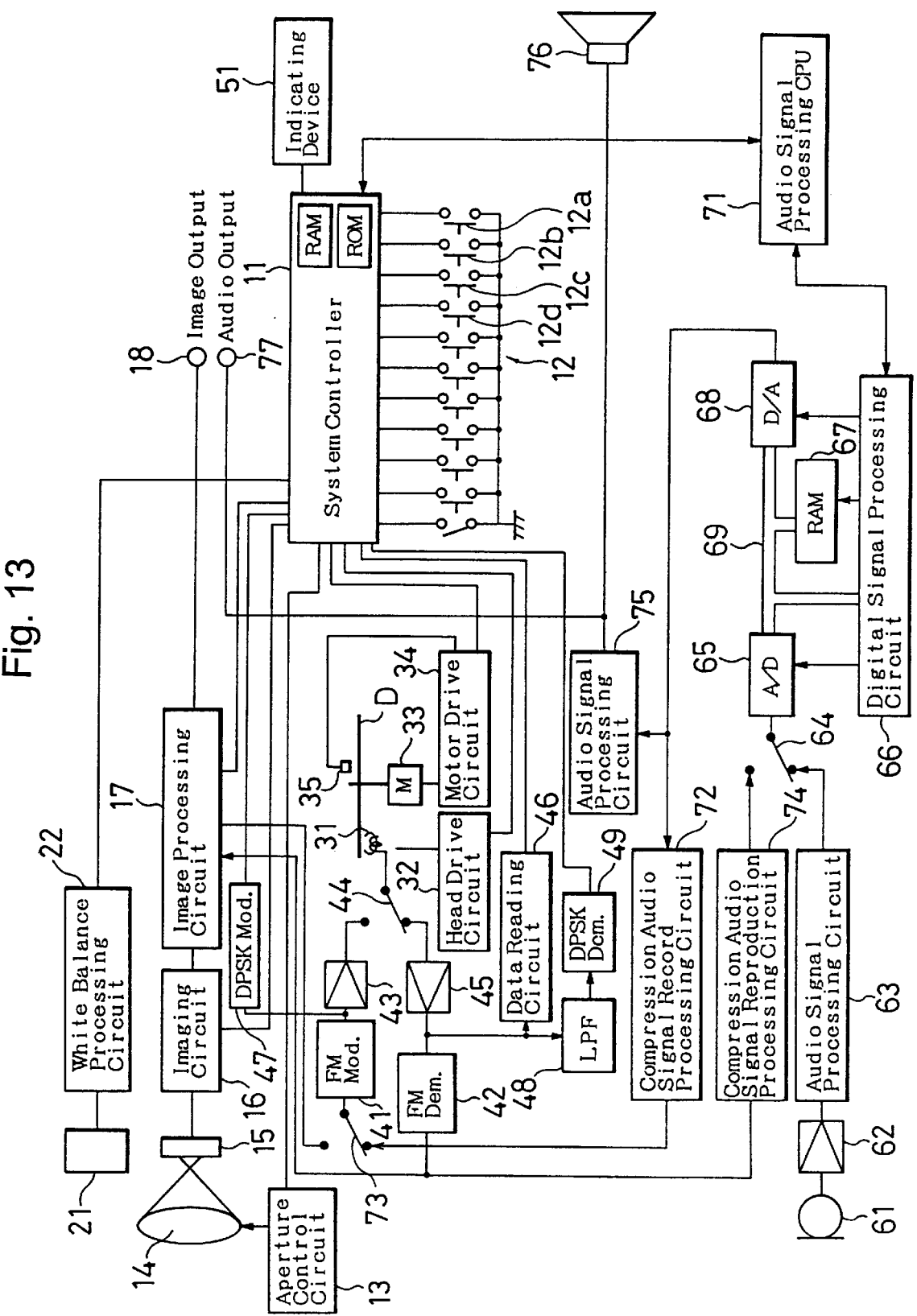
FIG. 13 is a block diagram of a control circuit of a third embodiment of an electronic still camera according to the present invention.

FIG. 13 illustrates a control circuit of a third embodiment of the electronic still camera of the present invention.

This embodiment is provided with an audio processing circuit, which is not provided in the previously described embodiments. In this embodiment, when the magnetic disk is a usual disk, sound can be recorded together with an image, and when the magnetic disk is a data disk, the content of the photographing control data can be vocally indicated.

As shown in FIG. 13, a microphone 61 is connected to an audio signal processing circuit 63 through a microphone amplifier 62. The audio signal processing circuit 63 is connected to an A/D converter 65 through a switch 64. Therefore, sound inputted through the microphone 61 is inputted to the A/D converter 65, and high frequency components of the sound are removed by the audio signal processing circuit 63 and A/D converted. The A/D converter 65, a digital signal processing circuit 66, a RAM 67 and a D/A converter 68 are interconnected by a data bus 69. The digital signal processing circuit 66 outputs a clock signal to the A/D converter 65, the RAM 67 and the D/A converter 68, and takes care of writing to the RAM 67 and reading the RAM 67. The digital signal processing circuit 66 is connected to an audio signal processing CPU 71, which is connected to the system controller 11. An audio signal processing CPU 71 carries out an input and an output of data to the digital signal processing circuit 66 and the system controller 11.

The D/A converter 68 is connected to a compression audio signal record processing circuit 72, which is connected to a frequency-modulation circuit 41 through a switch 73. Switch 73 is constructed in such a manner that the frequency-modulation circuit 41 is selectively connected to an image processing circuit 17 or to the compression audio signal record processing circuit 72. Switch 73 is connected to the image processing circuit 17 when recording an image, and connected to the compression audio signal record processing circuit 72 when recording sound. Therefore, when recording sound, the audio signal is inputted from the audio signal processing circuit 63 to the A/D converter 65 to be converted to a digital signal. Once the audio signal is transferred to the RAM 67, it is converted to an analog signal by the D/A converter 68, and inputted to the compression audio signal record processing circuit 72. Then, the audio signal is compressed to a period for which the magnetic disk D turns for one revolution thereof (for example, 1/60 seconds), and is frequency-modulated and recorded in a track of the magnetic disk D.

A compression audio signal reproduction processing circuit 74 is provided between a frequency-demodulation circuit 42 and the switch 64, which is switched under the a control of the system controller 11 through the audio signal processing CPU 71. The switch 64 is connected to the audio signal processing circuit 63 when recording a sound, and connected to the compression audio signal reproduction processing circuit 74 when reproducing the sound. Therefore, when reproducing the sound, an audio signal recorded on the magnetic disk D is frequency-demodulated, and subjected by the compression audio signal reproduction processing circuit 74 to a process which is the reverse of that of the process carried out by the compression audio signal record processing circuit 72, so as to expand the recorded signal to a predetermined period.

The audio signal is transmitted through the A/D converter 65, the RAM 67 and the D/A converter 68 to the audio signal processing circuit 75, where a high frequency component of the signal is removed. The audio signal is then amplified to a predetermined level, and reproduced by a reproducing device connected to an audio signal output terminal 77.

Figure 14:
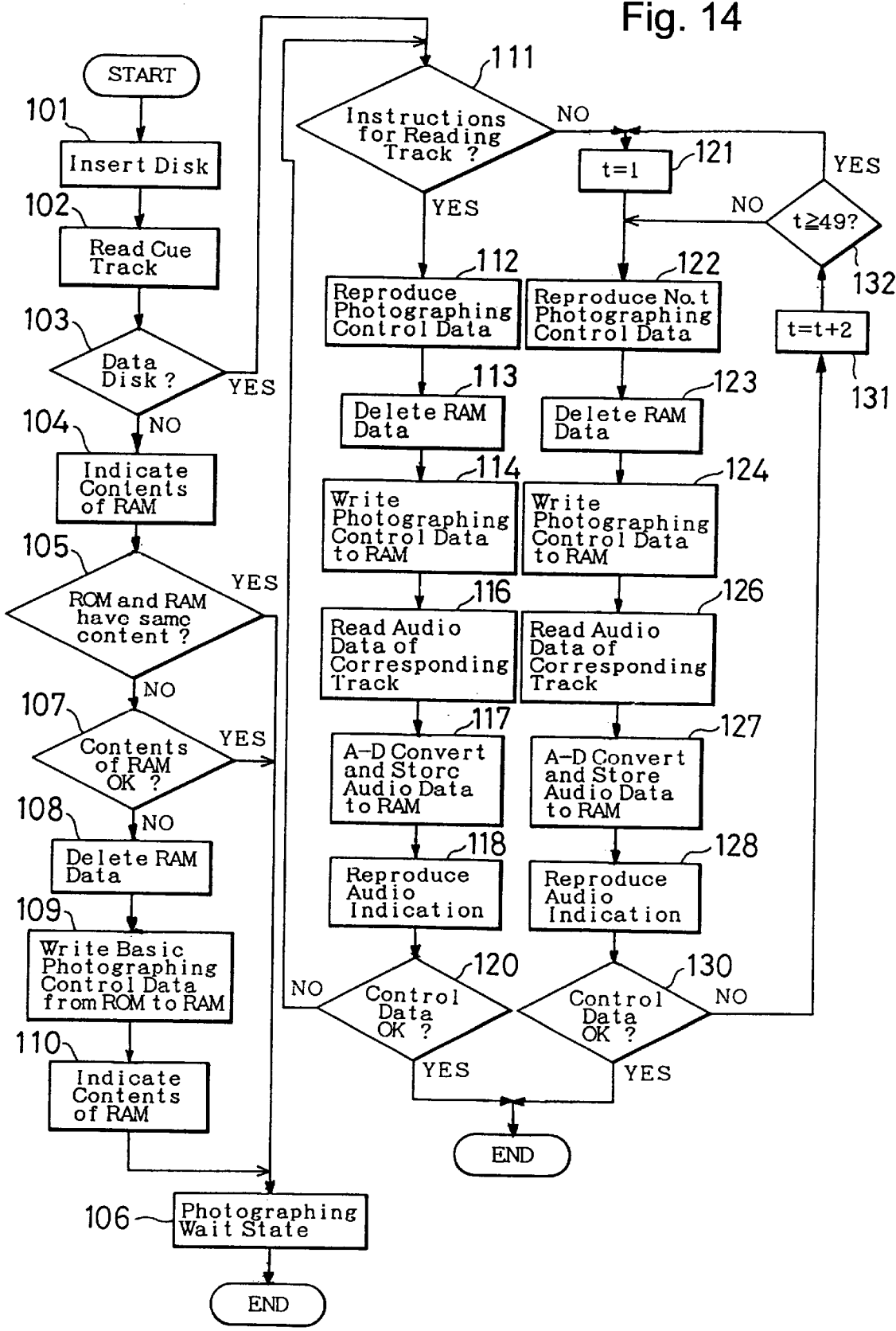
FIG. 14 is a flowchart showing a third example of a preparation for a photographing operation by the electronic still camera of the present invention.

FIG. 14 is a flowchart of an operation of the electronic still camera having the circuit shown in FIG. 13. In this embodiment, the contents currently stored in the RAM of the system controller 11 is verbally outputted from, for example, a speaker 76, so that the photographer can easily determine whether the photographing control data is as required.

To obtain a verbal confirmation of the photographing control data, steps 116 through 118, and steps 126 through 128 are provided. Steps 116 through 118 correspond to step 115 of the flowchart of FIG. 11, and steps 126 through 128 correspond to step 125 of the flowchart of FIG. 11. The operations of the steps other than steps 116 through 118 and steps 126 through 128 are the same as those of the corresponding steps of FIG. 11. Therefore, an explanation of these other steps is omitted In the following description.

In step 116, data of audio waveforms corresponding to the photographing control data written to the RAM of the system controller 11 in step 114 is read. In this embodiment, photographing control data is stored in odd number tracks of the magnetic disk, and the audio waveform data are stored in even number tracks. Further, each-audio waveform data is stored at one track inside, and adjacent to, the track of the corresponding photographing control data. Therefore, in step 116, the number of the track storing audio waveform data (which number is obtained by adding one to the number of the track of the photographing control data) is read.

The audio waveform data is A/D converted and stored in the RAM 67 of the audio signal processing circuit in step 117. In step 118, an audio indication indicating the contents of the photographing control data is outputted through an audio reproducing device connected to, for example, the speaker 76 or the audio output terminal 77. The photographer can determine by the verbal output whether the, photographing control data is as required, and then can input required data, if necessary, by operating a predetermined switch in step 120.

The operation of steps 126 through 128 are the same as those of steps 116 through 118. Namely, audio waveform data corresponding to the photographing control data written to the RAM of the system controller 11 in step 124 is read, is A/D converted, and is then stored in the RAM 67 of the audio signal processing circuit, and thereafter, is reproduced by the speaker 76 or other reproducing device.

As described above, according to this embodiment, photographing control data currently stored in the RAM of the system controller 11 are verbally (e.g., spoken) confirmed. Accordingly, the photographer can easily and accurately confirm the content of the photographing control data, and thus easily determine whether the photographing control data is as required.

In the embodiment of FIG. 13, although the audio waveform data corresponding to the photographing control data is stored in a data track adjacent to a data track in which the photographing control data is stored, the present invention is not restricted to this construction. For instance, the audio waveform data may be stored in another track. For example, the photographing control data may be stored in the $1^{st}$ through $25^{th}$ tracks of the magnetic disk, and the audio waveform data may be stored in the $26^{th}$ through $50^{th}$ tracks. In this case, information for correlating the photographing control data to the audio waveform data may be stored, for example, in the cue track, or in a control code of an audio signal, to be described below with reference to FIG. 18–20.

Figure 15:
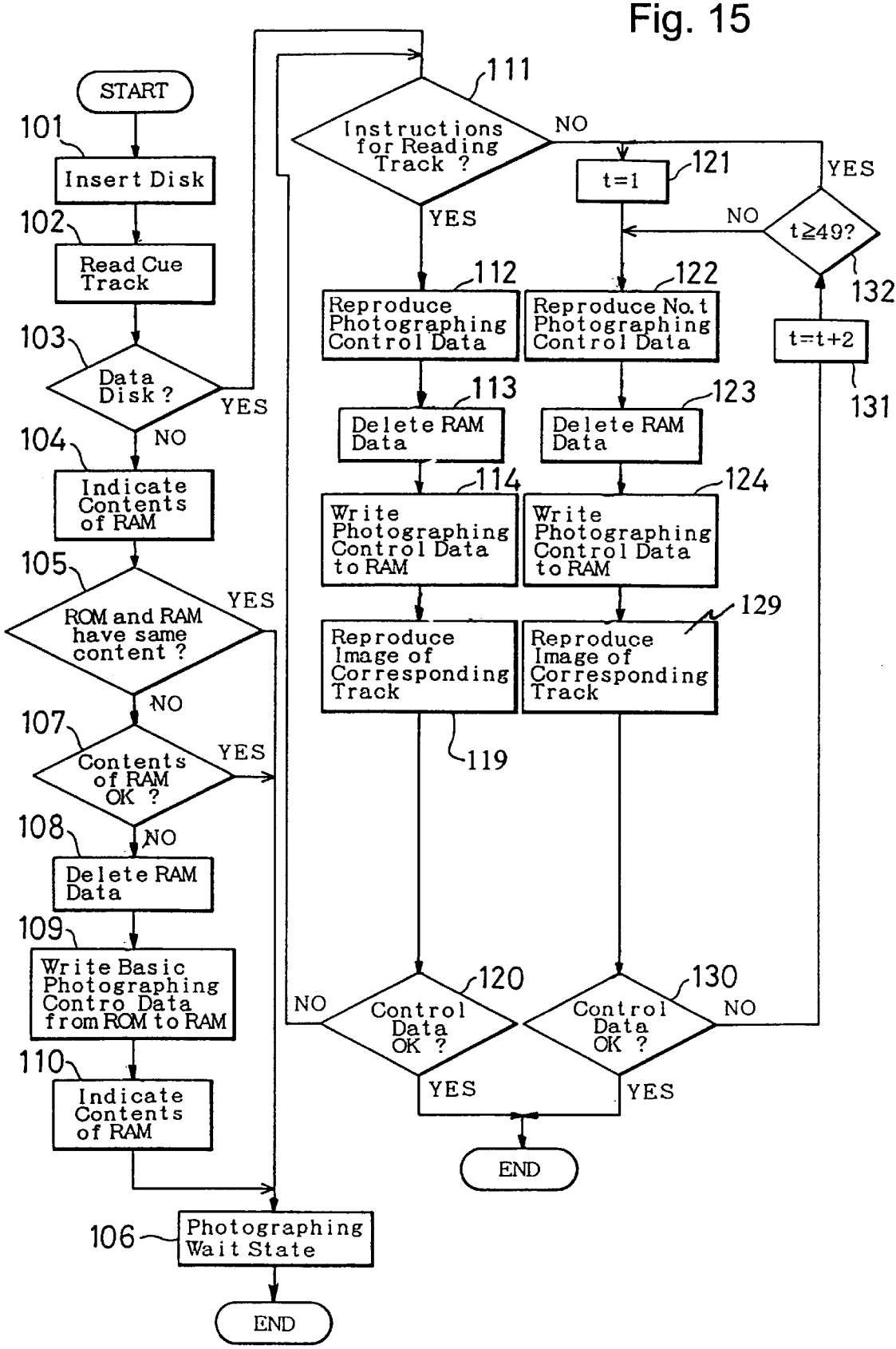
FIG. 15 is a flowchart showing a fourth example of a preparation for a photographing operation by the electronic still camera of the present invention.

FIG. 15 is another flowchart of an operation of the electronic still camera. In this operation, an example correctly expressing a characteristic of the photographing control data currently stored in the RAM of the system controller 11 is shown by a reproducing device (not shown) that is connected to the image output terminal 18, so that the photographer can easily determine whether the photographing control data is as required.

To confirm the photographing control data by the example of the image, steps 119 and 129 are provided. Stops 119 and 129 correspond to steps 115 and 125, respectively, of the flowchart shown in FIG. 12. Since the operations of the steps other than steps 119 and 129 are the same as those of the corresponding steps of FIG. 12, an explanation of the other steps is omitted.

In step 119, image data corresponding to the photographing control data written to the RAM of the system controller 11 in step 114 is read. This image data shows a typical example of an image photographed in accordance with the photographing control data. The image is outputted to the reproducing device and projected on the display surface thereof, as described above.

As in the embodiment of FIG. 14, the photographing control data is stored in an odd number track of the magnetic disk, and the image data is stored in an even number track, respectively. Each image data is stored in a track adjacent to an inside of the track in which the corresponding photographing control data is stored. Therefore, in step 119, image data of a track, the number of which is obtained by adding one to the number of the track of the photographing control data, is reproduced. The photographer can determine by this image whether the photographing control data is as required, and in step 120, input a "correct" or "incorrect" signal to the camera by operating a predetermined switch.

The operation in step 129 is the same as that in step 119.

Therefore, according to this embodiment, an example of the photographing control data currently stored in the RAM of the system controller 11 is confirmed by an image. Accordingly, the photographer can accurately recognize the content of the photographing control data, and easily determine whether the photographing control data is as required.

Note that the image data corresponding to the photographing control data is not necessarily stored in a track adjacent to the track in which the photographing control data is stored. Instead, it may be stored in another track. For example, the photographing control data may be stored in the $1^{st}$ through $25^{th}$ tracks of the magnetic disk, and the image data may be stored in the $26^{th}$ through $50^{th}$ tracks. In this case, information for relating the photographing control data to the image data may be, for example, stored in a cue track.

Figure 16:
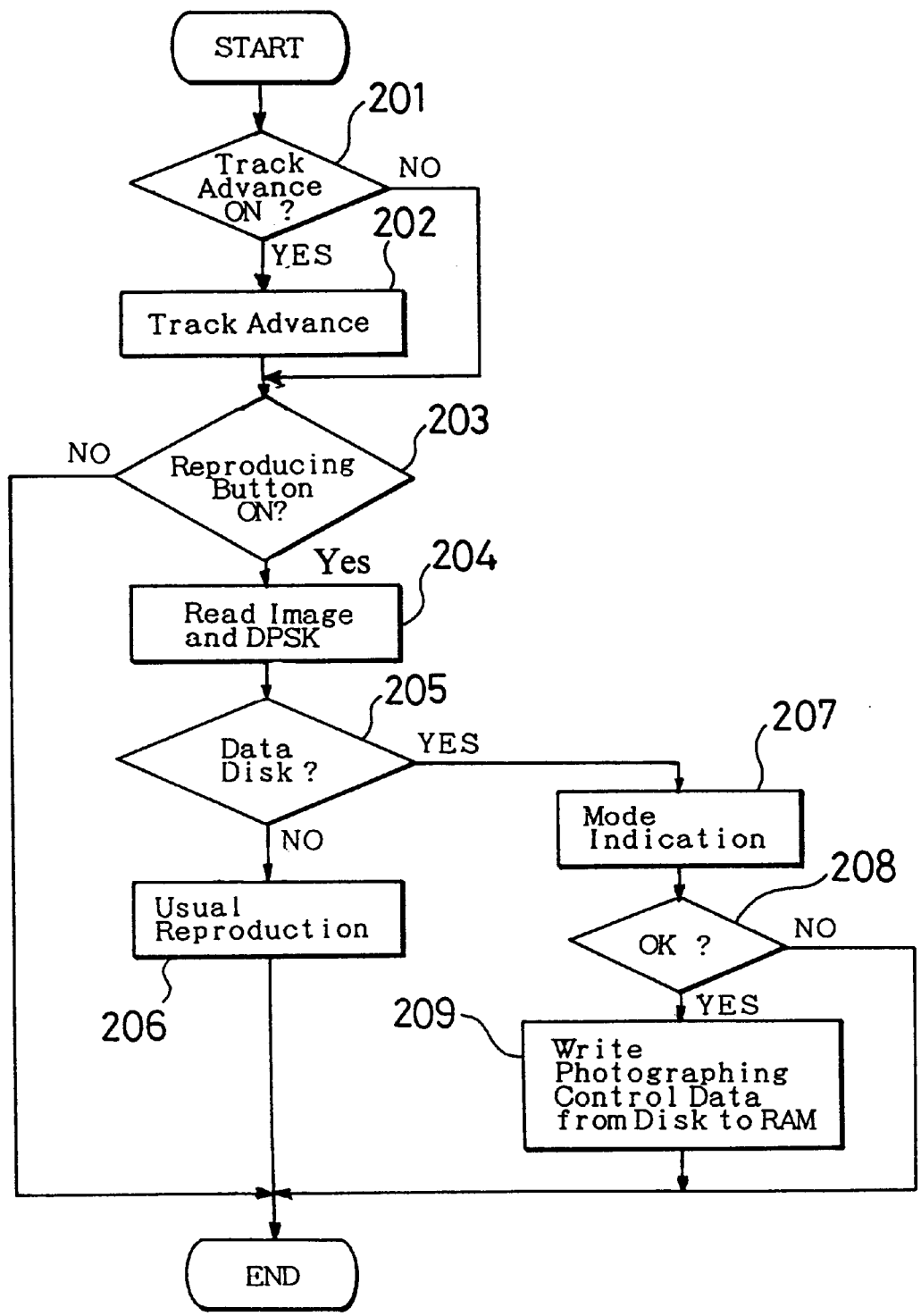
FIG. 16 is a flowchart showing a fifth example of a preparation for a photographing operation by the electronic still camera.

FIG. 16 is still another flowchart of an operation of the electronic still camera. In this operation, which is similar to the operation shown in FIG. 15, the photographer can select the photographing control data using an image.

In step 201, it is determined whether switch 12c (FIG. 1, 8 or 13) for advancing the track of the magnetic disk is turned ON. If switch 12c is not turned ON, step 202 is skipped, and step 203 is executed. Conversely, if switch 12c is turned ON, step 202 is executed and the data track is advanced by 1. In step 203, it is determined whether a reproducing button 12d associated with the camera is turned ON. When reproducing button 12d is not turned ON, this process is ended, but when the reproducing button 12d is turned ON, step 204 and the following steps are carried out, and a selection of the photographing control data is carried out.

In step 204, image data stored in a data track selected at that time, and reference data, are read. This image shows a typical example of an image photographed in accordance with the corresponding photographing control data, and is recorded in the same way as by the usual disk. Namely, the image signal is divided into a luminance signal and differential color signals, and frequency-modulated and recorded onto the disk. Further, although ID data, such as a photographing date, is usually DPSK-modulated and multiplex recorded on a track on which an image is recorded, in a data disk of this embodiment, a number of the track, as the reference data, on which the photographing control data corresponding to the image is DPSK-modulated and multiplex recorded on a user's area on which data is recorded in a form of a DPSK modulated signal.

In step 205, it is determined by the DPSK-modulated data whether the magnetic disk is a data disk or a usual disk. If it is a usual disk, a usual reproduction is carried out, i.e., in step 206, an image recorded on the usual disk is reproduced at a display surface of the reproducing device. Conversely, when it is determined in step 205 that a data disk is mounted in the disk drive device, information that a photographing by the photographing control data can be carried out is indicated by the indicating device 51 in step 207, and the image read in step 204 is displayed at a surface of the reproducing device.

By observing this image, the photographer can determine whether the photographing control data is as required, and then operate an operation switch 12b, in step 208, to select the photographing control data. When the photographing control data is correct, the photographing control data is read from the data disk to the RAM of the system controller 11 in step 209, and the process is ended. Thereafter, a photographing operation in accordance with the photographing control data is carried out.

On the other hand, when it is determined in step 208 that the photographing control data is not correct, step 209 is skipped and the photographing control data stored in the RAM of the system controller 11 is not changed. In this case, the photographer operates track advancing switch 12c or 12d (steps 201 and 202), turns the reproducing button ON (step 203), and checks the next image (steps 207 and 208). The correct photographing control data is selected by repeating this operation.

According to this embodiment, the same effect as that shown in FIG. 16 is obtained.

Figure 17:
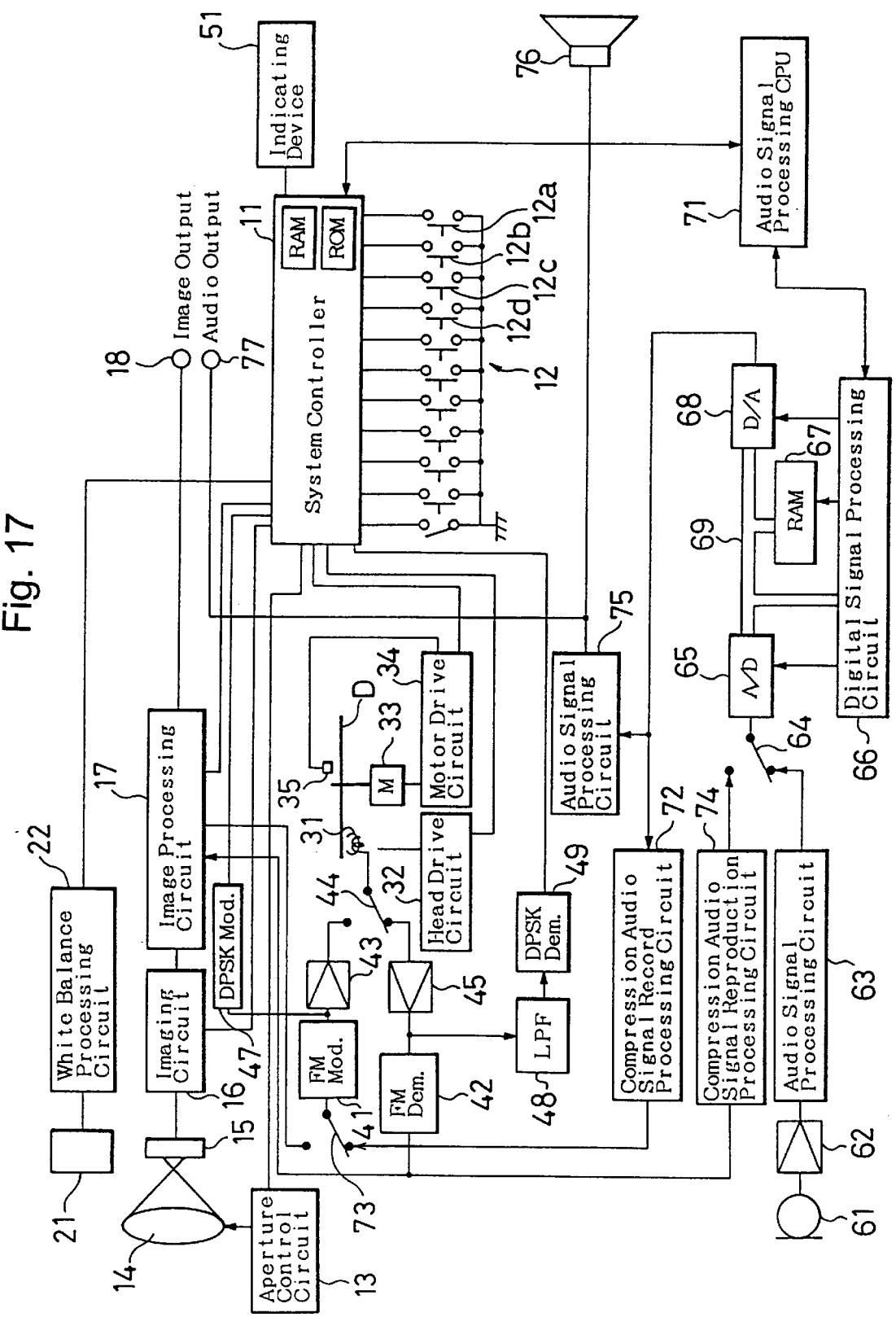
FIG. 17 is a block diagram of a control circuit of a fourth embodiment of an electronic still camera according to the present invention.

FIG. 17 illustrates a control circuit of a fourth embodiment of the electronic still camera of the present invention.

This embodiment has basically the same construction as the third embodiment shown in FIG. 13. Specifically, this electronic still camera is provided with an audio signal processor which includes the microphone 61, the microphone amplifier 62, the audio signal processing circuit 63, the switch 64, the A/D converter 65, the digital signal processing circuit 66, the RAM 67, the D/A converter 68, the audio signal processing CPU 71, the compression audio signal record processing circuit 72, the switch 73, and the compression audio signal reproduction processing circuit 74. However, this embodiment of an electronic still camera omits the data reading circuit 46. Further, a main difference between the third embodiment and the fourth embodiment of the present invention is that, in this embodiment, photographing control data is stored in the magnetic disk in a form of a control code of an audio signal.

In this embodiment, photographing control data, such as, for example, an f-number and a shutter speed, are stored in the data tracks $D_2$ (FIG. 2) and information indicating that the magnetic disk D is a data disk storing the photographing control data is stored in the cue track $D_1$.

The photographing control data is recorded on the magnetic disk in a form of a control code of an audio signal. Accordingly, before describing a recording format of the photographing control data, the recording of audio data in this electronic still camera is described below.

Figure 18:
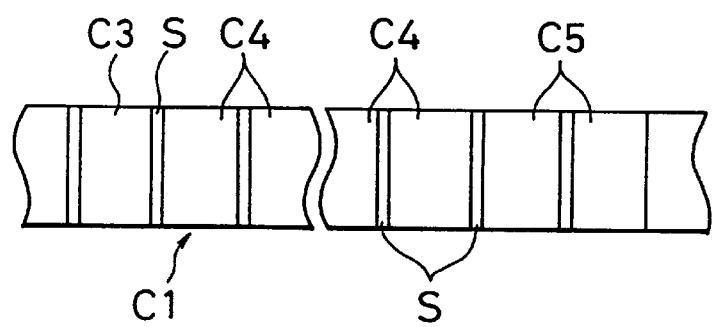
FIG. 18 is a schematic diagram of an audio signal used in a disk employed with the present invention.

FIG. 18 shows a format of an audio signal in a usual disk, wherein one track is divided into four sectors, and a signal which is started at a start flag F1 and ended at an end flag F2 is recorded in each sector. A control code C1 for recording a date, and an audio waveform signal C2, are recorded immediately after the start flag F1. In a sector In which the audio waveform signal C2 is recorded, the start flag F1 is a high level signal, as shown in FIG. 18, and the end flag F2 is a low level signal, as shown in FIG. 18 when an audio signal exists in the next sector, and is a high level signal when the audio signal ends at that sector.

Figure 19:
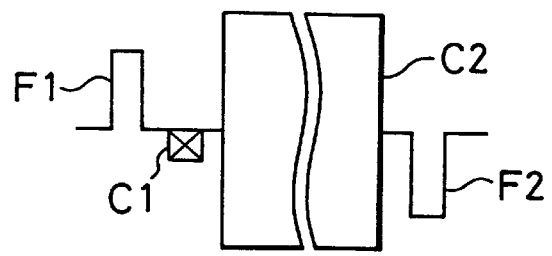
FIG. 19 is a schematic diagram of a control code used by the present invention.

As shown in FIG. 19, the control code C1 comprises a synchronization code C3 and data codes C4, which each consist of 8 bits, and a CRC code C5 consisting of two 8 bit signals. Each code is separated by a start bit S. Nine bytes of data codes C4 are provided in one control code C1. Synchronization code C3 denotes a start of the control code, and the CRC code C5 is provided for sensing an error when reading the control code.

As described above, although the start flag F1 is a high level signal when an audio signal C2 is recorded in that sector, the start flag F1 is a low level signal when an audio signal C2 is not recorded there. Accordingly, when the start flag F1 is a low level signal, the audio signal processor does not regard signals following the start flag as audio signals. This embodiment takes advantage of this phenomenon. Namely, the start flag F1 is set to a low level signal, and the photographing control data is recorded in a form of the control code behind this start flag. This data is then read by the audio signal processor and transmitted to the system controller.

Figure 20:
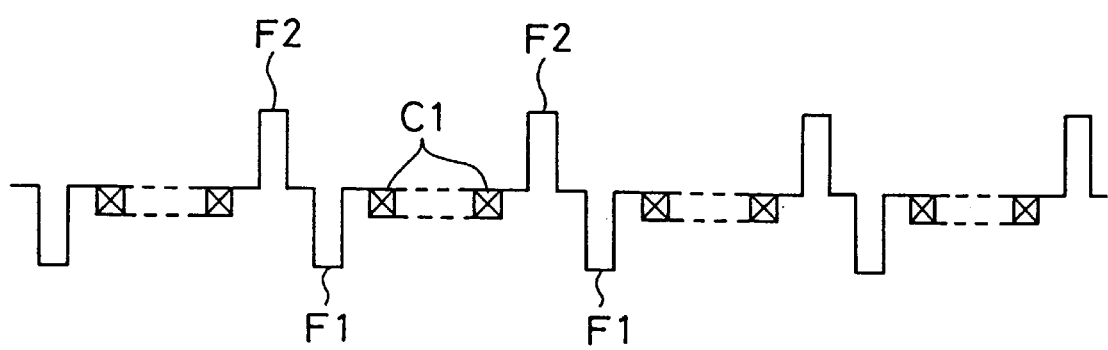
FIG. 20 is a schematic diagram of a photographing control data recorded in the form of a control code of an audio signal.

FIG. 20 schematically shows the photographing control data stored in the magnetic disk in a form of the control code. One sector starts at the start flag F1, which is a low level signal. This sector is provided with 64 control codes C1 and ends at the end flag F2. A maximum of four such sectors is provided in one data track.

Namely, the photographing control data shown in FIG. 10 is stored on the data disk in a form of a control code, and is read by the audio signal processor.

A reading operation by the audio signal processor is as follows:

First, the reading of an audio signal on a usual disk is described. A control signal denoting a time for which an audio signal is recorded, e.g., 5 seconds, 10 seconds or 20 seconds, is outputted by the system controller 11. This control signal is stored in the RAM 67 through the audio signal processing CPU 71 and the digital signal processing circuit 66. At the same time, an audio signal is transmitted through the audio signal processing circuit 63 and stored in the RAM 67 through the A/D converter 65. The control signal and the audio signal stored in the RAM 67 are recorded on the magnetic disk D through the D/A converter 68, the compression audio signal record processing circuit 72, the frequency-modulation circuit 41, and the amplifier 43.

When reading this audio signal from the magnetic disk D, the audio signal and the control signal are stored in the RAM 67 through the amplifier 45, the frequency-demodulation circuit 42, the compression audio signal reproduction processing circuit 74 and the A/D converter 65. The control signal stored in the RAM 67 is transmitted to the RAM of the system controller 11 by the digital signal processing circuit 66 and the audio signal processing CPU 71. Under the control of the system controller 11, the audio signal stored in the RAM 67 is outputted from the speaker 76 through the D/A converter 68 and the audio signal processing circuit 75, in accordance with a time (for example, 5 seconds) denoted by the control signal.

The above description is of a case in which the magnetic disk is a usual disk. Therefore, the start flag F1 is a high level signal. On the other hand, when the magnetic disk is a data disk, the start flag F1 is a low level signal. In this case, a signal stored in the data disk is stored in the RAM 67 through the amplifier 45, the frequency-demodulation 42, the compression audio signal reproducing circuit 74, and the A/D converter 65. The photographing control data read from the data disk to the RAM 67 is stored in the RAM of the system controller 11 through the digital signal processing circuit 66 and the audio signal processing CPU 71, and then, is analyzed by the system controller 11. Thus, the electronic still camera is controlled in accordance with the photographing control data. Note that the RAM 67 provided as an audio memory can be used as a RAM for storing photographing control data, so that the RAM in the system controller 11 can be omitted.

A preparation for a photographing operation by the electronic still camera of this embodiment is carried out in accordance with the flowchart shown in FIGS. 14 or 15. Note, that in step 112, the photographing control data is reproduced by the audio signal processor. The remaining operation is the same as described with regard to FIGS. 14 or 15.

The same effects as in the second and third embodiments are obtained according to this fourth embodiment. Further, since in the fourth embodiment, the photographing control data is stored on the magnetic disk in a form of the control code of an audio signal, a circuit used exclusively for reading the photographing control data need not be provided. Therefore, the construction of the whole control circuitry is made simpler.

Although, the photographing control data is stored in the magnetic disk in the above described embodiments, in which a program diagram consisting of the EV, the f-number and the shutter value is described, the present invention is not restricted to this example, and the photographing, control data may be, for example, a program for carrying out a zooming operation. In this case, the system controller 11 controls a zooming mechanism in accordance with the program obtained from the magnetic disk. Further, the control data obtained from the magnetic disk is not necessarily related to a photographing operation, and may be data for carrying out a control other than the photographing operation.

Although the embodiments of the present invention have been described herein with reference to the accompanying drawings, obviously many modifications and changes may be made by those skilled in this art without departing from the scope of the invention.

The present disclosure relates to subject matter contained in Japanese patent applications Nos. HEI 2-107371 (filed on Apr. 25, 1990), HEI 2-107372 (filed on Apr. 25, 1990), HEI 2-107373 (filed on Apr. 25, 1990), HEI 2-107374 (filed on Apr. 25, 1990), and HEI 2-124917 (filed on May 15, 1990), which are expressly incorporated herein by references in their entirety.

What is claimed is:

1. An electronic still camera, comprising:
a system that receives a disk, said disk comprising one of an instruction disk and a recording disk, a plurality of control data and information indicating a control to be performed being stored on said instruction disk, said information being stored on said instruction disk as at least one of a video signal and an audio signal, said video signal displaying an image indicating a characteristic of said control data, said audio signal audibly outputting said characteristic; a predetermined signal being recorded to said recording disk;
a selecting device by which a user of said electronic still camera manually selects a desired control data from said plurality of control data stored on said instruction disk;
a device that reads said desired control data from said instruction disk;
a controller that controls an operation of said electronic still camera to photograph a still image in accordance with said desired control data read by said reading device;
a reproducing system that reproduces said predetermined signal and said information corresponding to said desired control data read by said reading device; and
an output system that outputs said information reproduced by said reproducing system as one of an image and a sound to enable the user to confirm said desired control data selected by said selecting device.

2. The electronic still camera of claim 1, wherein said predetermined signal comprises a video signal.

3. The electronic still camera of claim 1, wherein said predetermined signal comprises an audio signal.

4. The electronic still camera of claim 1, wherein said plurality of control data are provided for setting a combination of an f-number and a shutter speed in order to control a photographing operation of said electronic still camera.

5. The electronic still camera of claim 1, further comprising a memory for storing said control data read by said reading device, said controller controlling an operation of said electronic still camera in accordance with said control data stored in said memory.

6. The electronic still camera of claim 1, wherein said instruction disk is provided with a plurality of tracks, each of said plurality of tracks storing one kind of control data.

7. The electronic still camera of claim 1, further comprising a system that performs a presearch operation when said disk is inserted into said receiving system to determine whether said disk is one of said instruction disk and said recording disk.

8. The electronic still camera of claim 1, further comprising a system that relates said control data to said information which corresponds to said control data.

9. An electronic still camera, comprising:
a system that receives a disk, said disk comprising one of:
an instruction disk on which a plurality of control data and information indicating a control to be carried out are stored, said information being stored on said instruction disk as at least one of a video signal and an audio signal, said plurality of control data being stored in at least one data track of said instruction disk, said video signal displaying an image indicating a characteristic of said control data, said audio signal audibly outputting said characteristic; and a recording disk on which a still image can be recorded;

a selecting device by which a user of said electronic still camera manually selects a desired control data from said plurality of control data stored on said instruction disk;

a system that reads said desired control data from said instruction disk;

a controller that controls an operation of said electronic still camera to photograph a still image in accordance with said control data read from said instruction disk by said reading system;

a system that records at least one of a video signal representing said photographed still image and an audio signal representing sound on said recording disk;

a system that produces said still image and said information corresponding to said control data read by said reading system; and a system that outputs said information reproduced by said reproducing system as one of an image and a sound to enable the user to confirm said desired control data selected by said selecting device.

10. The electronic still camera of claim 9, wherein said instruction disk contains a cue track that stores a cue signal, said desired control data being stored in said cue track from said instruction disk.

11. The electronic still camera of claim 9, wherein said plurality of control data is stored on said instruction disk in a DPSK-modulated format.

12. The electronic still camera of claim 9, wherein said plurality of control data is provided for setting a combination of an f-number and a shutter speed to control a photographing operation of said electronic still camera.

13. The electronic still camera of claim 9, wherein said output system comprises a display device.

14. The electronic still camera of claim 9, wherein said output system comprises a speaker.

15. An electronic still camera, comprising:

a disk, said disk comprising one of:
  a first disk on which control data is stored;
  a second disk on which a predetermined signal can be recorded; and
  a third disk on which said control data is stored and said predetermined signal can be recorded, said third disk having a first data track for storing said control data, said third disk having a second track for storing information indicating a control to be carried out by said control data;

a receiver that receives said magnetic disk;

a reader that reads said control data from said disk received from said receiver;

a controller that controls a photographing operation of said electronic still camera to photograph a still image in accordance with said control data read by said reader;

a recorder that records said photographed still image to said disk;

a disk type determiner that performs a presearch operation when said disk is inserted into said receiver to determine whether said disk is a recording disk in which said control data is not stored; and means for enabling said recorder to record said photographed still image to said disk only when said disk type determiner determines that said disk is said recording disk.

16. The electronic still camera of claim 15, wherein said information is stored in said second data track of said disk in the form of a video signal.

17. The electronic still camera of claim 15, wherein said control data is stored on said disk in the form of DPSK-modulated data.

18. The electronic still camera of claim 15, further comprising means for recording audio data on said disk, wherein said control data is stored on said disk in the form of a control code of an audio signal.

19. The electronic still camera of claim 15, wherein said disk comprises a plurality of tracks, each of said plurality of tracks storing one kind of control data.

20. The electronic still camera of claim 15, wherein said control data comprises an f-number and a shutter speed for controlling said photographing operation of said electronic still camera.

21. The electronic still camera of claim 15, further comprising means for recording audio data on said disk.

22. An electronic still camera, comprising:

means for receiving a disk, said disk comprising one of:
  an instruction disk on which control data is stored, said control data being stored in at least one data track of said instruction disk; and
  a recording disk on which a still image is recordable;

means for reading said control data from said instruction disk;

means for controlling an operation of said electronic still camera to photograph a still image in accordance with said control data read from said instruction disk by said reading means;

means for recording at least one of a video signal, representing said photographed still image, and an audio signal, representing sound, on one of said instruction disk and said recording disk;

means for performing a presearch operation when said disk is inserted into said receiving means to determine whether said disk comprises said instruction disk or said recording disk; and means for prohibiting said operation of said electronic still camera to photograph a still image when said instruction disk is inserted into said receiving means.

23. A disk mounted in an electronic still camera, comprising:

a first track in which a video signal can be stored; and a second track in which an audio signal can be stored, wherein control data, by which a photographing operation of said electronic still camera is controlled, is stored in said second track as a control code of an audio signal, said second track being divided into a plurality of sectors which include a start flag, said control code, an audio information and an end flag recorded in this order when said audio signal is stored, and which includes said start flag, said control code, and said end flag recorded in this order when said control data are stored.

24. An electronic still camera, comprising:

a receiver, said receiver being adapted to receive a disk, said disk comprising one of an instruction disk and a recording disk, a plurality of control data and information indicating a control to be performed being stored on said instruction disk, said information being stored on said instruction disk as at least one of a video signal and an audio signal, said video signal displaying an image indicating a characteristic of said control data, said audio signal audibly outputting said characteristic, a predetermined signal being recorded to said recording disk;

a selecting device by which a user of said electronic still camera manually selects a desired control data from said plurality of control data stored on said instruction disk;

a reader, said reader being adapted to read said desired control data from said instruction disk;

a controller that controls an operation of said electronic still camera to photograph a still image in accordance with said desired control data read by said reader;

a reproducing system, said reproducing system reproducing said predetermined signal and said information corresponding to said desired control data read by said reader; and an output mechanism, said output mechanism outputting said information reproduced by said reproducing system as one of an image and a sound to enable the user to confirm said desired control data selected by said selecting device.

25. An electronic still camera, comprising:

a receiver, said receiver being adapted to receive a disk, said disk comprising one of an instruction disk and a recording disk, a predetermined signal being recorded to said recording disk, a plurality of control data and information indicating a control to be performed being stored on said instruction disk, said instruction disk including a first track in which a video signal can be stored and a second track in which an audio signal can be stored, wherein control data, by which a photographing operation of said electronic still camera is controlled, are stored in said second track as a control code of an audio signal, said second track being divided into a plurality of sectors which include a start flag, said control code, an audio information and an end flag recorded in this order when said audio signal is stored, and which includes said start flag, said control code and said end flag, recorded in this order when said control data are stored;

a selecting device by which a user of said electronic still camera can manually select a desired control data from said plurality of control data stored on said instruction disk;

a reader, said reader being adapted to read said desired control data from said instruction disk;

a controller, said controller being adapted to control an operation of said electronic still camera to photograph a still image in accordance with said desired control data read by said reader;

a reproducing system, said reproducing system reproducing said predetermined signal and said information corresponding to said desired control data read by said reader; and an output mechanism, said output mechanism outputting said information reproduced by said reproducing system as one of said image and a sound to enable the user to confirm said desired control data selected by said selecting device.

* * * * *